(12) United States Patent
Manolakos et al.

(10) Patent No.: US 12,204,042 B2
(45) Date of Patent: Jan. 21, 2025

(54) COMMUNICATION SYSTEM RADAR SIGNALING

(71) Applicant: QUALCOMM Incorporated, San Diego, CA (US)

(72) Inventors: Alexandros Manolakos, Escondido, CA (US); Seyong Park, San Diego, CA (US); Weimin Duan, San Diego, CA (US); Xiaoxin Zhang, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 689 days.

(21) Appl. No.: 17/195,097

(22) Filed: Mar. 8, 2021

(65) Prior Publication Data

US 2022/0283262 A1    Sep. 8, 2022

(51) Int. Cl.
*G01S 7/00* (2006.01)
*G01S 7/02* (2006.01)
*H04W 8/24* (2009.01)

(52) U.S. Cl.
CPC .............. *G01S 7/006* (2013.01); *G01S 7/021* (2013.01); *H04W 8/24* (2013.01)

(58) Field of Classification Search
CPC ........... G01S 7/006; G01S 7/021; H04W 8/24
See application file for complete search history.

(56) References Cited

U.S. PATENT DOCUMENTS

2012/0196528 A1* 8/2012 Kazmi ................. H04W 52/46
455/9

2017/0276780 A1* 9/2017 Takehara ................ G01S 7/411
(Continued)

OTHER PUBLICATIONS

"3rd Generation Partnership Project, Technical Specification Group Radio Access Network, Evolved Universal Terrestrial Radio Access (E-UTRA), User Equipment (UE) Radio Transmission and Reception, (Release 8)", 3GPP Standard, 3GPP TR 36.803, 3rd Generation Partnership Project, Mobile Competence Centre, 650, Route Des Lucioles, F-06921 Sophia-Antipolis Cedex, France, No. V0.3.0, May 1, 2007, pp. 1-35, XP050380418, 37 Pages.

(Continued)

*Primary Examiner* — Bernarr E Gregory
*Assistant Examiner* — Hailey R Le
(74) *Attorney, Agent, or Firm* — QUALCOMM Incorporated

(57) ABSTRACT

A communication device includes a processor configured to: transfer, via a transceiver, a wireless data signal within a communication frequency range; determine a capability of the communication device to measure a wireless radar signal received via the transceiver, the wireless radar signal having a frequency within the communication frequency range; transmit, via the transceiver to a network entity, a first indication of the capability of the communication device to measure the wireless radar signal, the first indication being indicative of a transmit power level of the wireless radar signal from a source of the wireless radar signal or a received power level of the wireless radar signal at the communication device; receive, via the transceiver, the wireless radar signal; determine a positioning measurement of the wireless radar signal; and transmit a second indication of the positioning measurement via the transceiver to the network entity.

44 Claims, 13 Drawing Sheets

(56) References Cited

U.S. PATENT DOCUMENTS

| | | | |
|---|---|---|---|
| 2019/0037338 A1* | 1/2019 | Edge | H04W 4/02 |
| 2019/0164423 A1* | 5/2019 | Bai | G08G 1/096791 |
| 2020/0229102 A1* | 7/2020 | Gubeskys | H04W 52/146 |
| 2021/0120503 A1* | 4/2021 | Liu | H04W 52/243 |
| 2021/0392517 A1* | 12/2021 | Khalid | H04W 8/22 |
| 2023/0069947 A1* | 3/2023 | Lee | H04L 1/0061 |

OTHER PUBLICATIONS

Huawei, et al., "NR Positioning Measurements", 3GPP TSG RAN WG1 Meeting #98, R1-1908116, 3rd Generation Partnership Project, Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Aug. 17, 2019, XP051764736, 14 pages.

Intel Corporation: "Physical Layer Measurements for NR Positioning", 3GPP TSG RAN WG1 Meeting #98, R1-1908661, Intel—Measurements, 3rd Generation Partnership Project, Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Aug. 17, 2019, XP051765269, 20 Pages.

International Search Report and Written Opinion—PCT/US2022/015579—ISA/EPO—May 19, 2022.

Nokia, et al., "Scope of RRM Requirements for NR Positioning", 3GPP TSG-RAN WG4 Meeting #92, R4-1909365, Scope of RRM Requirements for NR Positioning, 3rd Generation Partnership Project, Mobile Competence Centre, 650 Route Des Lucioles, F-06921 Sophia-Antipolis Cedex, France, vol. RAN WG4, No. Ljubljana, Slovenia, Aug. 26, 2019-Aug. 30, 2019, Aug. 16, 2019, XP051772258, 8 Pages.

* cited by examiner

| Tx antenna/panel/chain | Rx antenna/panel/chain | Sensitivity | Saturation |
|---|---|---|---|
| Ant1, chainX | Ant1, chainY | Sens1 | |
| Ant1, panel1, chainX | Ant1, chainY | | Sat1 |

COMMUNICATION SYSTEM RADAR SIGNALING

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

An example communication device includes: a transceiver; a memory; and a processor communicatively coupled to the transceiver and the memory and configured to: transfer, via the transceiver, a wireless data signal within a communication frequency range; determine a capability of the communication device to measure a wireless radar signal received via the transceiver, the wireless radar signal having a frequency within the communication frequency range; transmit, via the transceiver to a network entity, a first indication of the capability of the communication device to measure the wireless radar signal, the first indication being indicative of a transmit power level of the wireless radar signal from a source of the wireless radar signal or a received power level of the wireless radar signal at the communication device; receive, via the transceiver, the wireless radar signal; determine a positioning measurement of the wireless radar signal; and transmit a second indication of the positioning measurement via the transceiver to the network entity.

Implementations of such a communication device may include one or more of the following features. The first indication is indicative of one or more received power levels including a sensitivity power level, or a saturation power level, or both the sensitivity power level and the saturation power level. The first indication is indicative of the received power level, the first indication being a relative power level. The first indication is indicative of the transmit power level, the first indication indicating a successful processing of the wireless radar signal. The received power level is a first received power level of the wireless radar signal received as a reflected signal, and the first indication is indicative of the first received power level relative to a second received power level of the wireless radar signal received as a leakage signal. The received power level is a first received power level of the wireless radar signal, and the first indication is indicative of the first received power level relative to a second received power level of the wireless data signal. The processor is configured to determine the first indication in response to receiving a request, from the network entity via the transceiver, for processing of the wireless radar signal. The processor is: configured to transmit the first indication in response to a request from the network entity to process the wireless radar signal; or configured to transmit the first indication periodically; or configured to transmit the first indication semi-persistently; or any combination thereof.

Also or alternatively, implementations of such a communication device may include one or more of the following features. The processor is configured to determine the first indication based on: (1) a first frequency band, within the communication frequency range, for receiving the wireless radar signal; or (2) a first frequency band combination, within the communication frequency range, for receiving the wireless radar signal; or (3) a combination of the first frequency band and a second frequency band, within the communication frequency range, for transfer of the wireless data signal concurrently with receiving the wireless radar signal; or (4) a combination of the first frequency band and a second frequency band combination, within the communication frequency range, for transfer of the wireless data signal concurrently with receiving the wireless radar signal; or (5) a frequency gap between a first resource element of the wireless radar signal and a second resource element of the wireless data signal; or (6) one or more components selected by the processor to receive the wireless radar signal; or (7) one or more components available for selection to receive the wireless radar signal; or (8) expected attenuation of the wireless radar signal; or (9) a transmit power of the transceiver used to transmit the wireless data signal; or (10) a pairing of one or more radio frequency transmit components of the communication device and one or more radio frequency receive components of the communication device; or (11) a resource set of the wireless radar signal, or a resource of the wireless radar signal, or a frequency layer of the wireless radar signal; or any combination of (1)-(11). The processor is configured to transmit the first indication associated with one of (1)-(11) or a combination of two or more of (1)-(11).

Also or alternatively, implementations of such a communication device may include one or more of the following features. The first indication includes a device type of the communication device.

Another example communication device includes: means for transferring a wireless data signal within a communication frequency range; means for determining a capability of the communication device to measure a wireless radar signal having a frequency within the communication frequency range; means for transmitting, to a network entity, a first indication of the capability of the communication device to measure the wireless radar signal, the first indication being indicative of a transmit power level of the wireless radar signal from a source of the wireless radar signal or a received power level of the wireless radar signal at the communication device; means for receiving the wireless radar signal; means for determining a positioning measurement of the wireless radar signal; and means for transmitting, to the network entity, a second indication of the positioning measurement.

Implementations of such a communication device may include one or more of the following features. The first indication is indicative of one or more received power levels including a sensitivity power level, or a saturation power level, or both the sensitivity power level and the saturation power level. The first indication is indicative of the received power level, the first indication being a relative power level. The first indication is indicative of the transmit power level, the first indication indicating a successful processing of the wireless radar signal. The received power level is a first received power level of the wireless radar signal received as a reflected signal, and the first indication is indicative of the first received power level relative to a second received power level of the wireless radar signal received as a leakage signal. The received power level is a first received power level of the wireless radar signal, and the first indication is indicative of the first received power level relative to a second received power level of the wireless data signal. The communication device includes means for determining the first indication in response to receiving a request, from the network entity, for processing of the wireless radar signal. The means for transmitting the first indication include: means for transmitting the first indication in response to a request from the network entity to process the wireless radar signal; or means for transmitting the first indication periodically; or means for transmitting the first indication semi-persistently; or any combination thereof.

Also or alternatively, implementations of such a communication device may include one or more of the following features. The communication device includes means for determining the first indication based on: (1) a first frequency band, within the communication frequency range, for receiving the wireless radar signal; or (2) a first frequency band combination, within the communication frequency range, for receiving the wireless radar signal; or (3) a combination of the first frequency band and a second frequency band, within the communication frequency range, for transfer of the wireless data signal concurrently with receiving the wireless radar signal; or (4) a combination of the first frequency band and a second frequency band combination, within the communication frequency range, for transfer of the wireless data signal concurrently with receiving the wireless radar signal; or (5) a frequency gap between a first resource element of the wireless radar signal and a second resource element of the wireless data signal; or (6) one or more components selected to receive the wireless radar signal; or (7) one or more components available for selection to receive the wireless radar signal; or (8) expected attenuation of the wireless radar signal; or (9) a transmit power of the means for transferring the wireless data signal; or (10) a pairing of one or more radio frequency transmit components of the communication device and one or more radio frequency receive components of the communication device; or (11) a resource set of the wireless radar signal, or a resource of the wireless radar signal, or a frequency layer of the wireless radar signal; or any combination of (1)-(11). The means for transmitting the first indication include means for transmitting the first indication associated with one of (1)-(11) or a combination of two or more of (1)-(11).

Also or alternatively, implementations of such a communication device may include one or more of the following features. The first indication includes a device type of the communication device.

An example method of reporting radar signal measuring capability includes: determining, at a communication device, a capability of the communication device to measure a wireless radar signal having a frequency in a communication frequency range; and transmitting, from the communication device to a network entity, a capability indication of the capability of the communication device to measure the wireless radar signal, the capability indication being indicative of a transmit power level of the wireless radar signal from a source of the wireless radar signal or a received power level of the wireless radar signal at the communication device.

Implementations of such a method may include one or more of the following features. The capability indication is indicative of one or more received power levels including a sensitivity power level, or a saturation power level, or both the sensitivity power level and the saturation power level. The capability indication is indicative of the received power level of the wireless radar signal, the capability indication being a relative power level. The capability indication is indicative of the transmit power level, the capability indication indicating a successful processing of the wireless radar signal. The received power level is a first received power level of the wireless radar signal received as a reflected signal, and the capability indication is indicative of the first received power level relative to a second received power level of the wireless radar signal received as a leakage signal. The received power level is a first received power level of the wireless radar signal, and the capability indication is indicative of the first received power level relative to a second received power level of the wireless data signal. The method includes determining the capability indication in response to receiving a request, from the network entity, for processing of the wireless radar signal. Transmitting the capability indication includes: transmitting the capability indication in response to a request from the network entity to process the wireless radar signal; or transmitting the capability indication periodically; or transmitting the capability indication semi-persistently; or any combination thereof.

Also or alternatively, implementations of such a method may include one or more of the following features. The method includes determining the capability indication based on: (1) a first frequency band, within the communication frequency range, for receiving the wireless radar signal; or (2) a first frequency band combination, within the communication frequency range, for receiving the wireless radar signal; or (3) a combination of the first frequency band and a second frequency band, within the communication frequency range, for transfer of a wireless data signal concurrently with receiving the wireless radar signal; or (4) a combination of the first frequency band and a second frequency band combination, within the communication frequency range, for transfer of the wireless data signal concurrently with receiving the wireless radar signal; or (5) a frequency gap between a first resource element of the wireless radar signal and a second resource element of the wireless data signal; or (6) one or more components selected to receive the wireless radar signal; or (7) one or more components available for selection to receive the wireless radar signal; or (8) expected attenuation of the wireless radar signal; or (9) a transmit power used to transmit the wireless data signal from the communication device; or (10) a pairing of one or more radio frequency transmit components of the communication device and one or more radio frequency receive components of the communication device; or (11) a resource set of the wireless radar signal, or a resource of the wireless radar signal, or a frequency layer of the wireless radar signal; or any combination of (1)-(11). Transmitting the capability indication includes transmitting the capability indication associated with one of (1)-(11) or a combination of two or more of (1)-(11).

Also or alternatively, implementations of such a method may include one or more of the following features. The capability indication includes a device type of the communication device.

An example non-transitory, processor-readable storage medium includes processor-readable instructions configured to cause a processor of a communication device to: determine a capability of the communication device to measure a wireless radar signal having a frequency in a communication frequency range; and transmit, to a network entity, a capability indication of the capability of the communication device to measure the wireless radar signal, the capability indication being indicative of a transmit power level of the wireless radar signal from a source of the wireless radar signal or a received power level of the wireless radar signal at the communication device.

Implementations of such a storage medium may include one or more of the following features. The capability indication is indicative of one or more received power levels including a sensitivity power level, or a saturation power level, or both the sensitivity power level and the saturation power level. The capability indication is indicative of the received power level of the wireless radar signal, the capability indication being a relative power level. The capability indication is indicative of the transmit power level, the capability indication indicating a successful processing of the wireless radar signal. The received power level is a first received power level of the wireless radar signal received as a reflected signal, and the capability indication is indicative of the first received power level relative to a second received power level of the wireless radar signal received as a leakage signal. The received power level is a first received power level of the wireless radar signal, and the capability indication is indicative of the first received power level relative to a second received power level of the wireless data signal. The storage medium includes processor-readable instructions configured to cause the processor to determine the capability indication in response to receiving a request, from the network entity, for processing of the wireless radar signal. The processor-readable instructions configured to cause the processor to transmit the capability indication include processor-readable instructions configured to cause the processor to: transmit the capability indication in response to a request from the network entity to process the wireless radar signal; or transmit the capability indication periodically; or transmit the capability indication semi-persistently; or any combination thereof.

Also or alternatively, implementations of such a storage medium may include one or more of the following features. The storage medium includes processor-readable instructions configured to cause the processor to determine the capability indication based on: (1) a first frequency band, within the communication frequency range, for receiving the wireless radar signal; or (2) a first frequency band combination, within the communication frequency range, for receiving the wireless radar signal; or (3) a combination of the first frequency band and a second frequency band, within the communication frequency range, for transfer of a wireless data signal concurrently with receiving the wireless radar signal; or (4) a combination of the first frequency band and a second frequency band combination, within the communication frequency range, for transfer of the wireless data signal concurrently with receiving the wireless radar signal; or (5) a frequency gap between a first resource element of the wireless radar signal and a second resource element of the wireless data signal; or (6) one or more components selected to receive the wireless radar signal; or (7) one or more components available for selection to receive the wireless radar signal; or (8) expected attenuation of the wireless radar signal; or (9) a transmit power used to transmit the wireless data signal from the communication device; or (10) a pairing of one or more radio frequency transmit components of the communication device and one or more radio frequency receive components of the communication device; or (11) a resource set of the wireless radar signal, or a resource of the wireless radar signal, or a frequency layer of the wireless radar signal; or any combination of (1)-(11). The processor-readable instructions configured to cause the processor to transmit the capability indication include processor-readable instructions configured to cause the processor to transmit the capability indication associated with one of (1)-(11) or a combination of two or more of (1)-(11).

Also or alternatively, implementations of such a storage medium may include one or more of the following features. The capability indication includes a device type of the communication device.

An example radar server includes: a transceiver; a memory; and a processor communicatively coupled to the transceiver and the memory and configured to: receive, via the transceiver from each of a plurality of first communication devices, a first indication of a capability of a respective one of the plurality of first communication devices to measure a first wireless radar signal; determine, based on the first indication from each of the plurality of first communication devices, at least a subset of the plurality of first communication devices to act as wireless radar signal receivers; transmit second indications to a plurality of second communication devices indicating to transmit second radar signals; and transmit third indications to the at least a subset of the plurality of first communication devices indicating to receive the second radar signals.

Implementations of such a radar server may include one or more of the following features. The processor is configured to transmit the second indications with each of at least one of the second indications indicating a transmit power to be used by a respective communication device of the plurality of second communication devices. The processor is configured to transmit one or more fourth indications via the transceiver to establish a respective training phase window for one or more of the plurality of first communication devices to use to determine the first indication. The processor is configured to transmit a fifth indication via the transceiver to each of at least a subset of the plurality of second communication devices indicating to transmit a plurality of test wireless radar signals each with a different transmit power. The processor is configured to: receive a sixth indication from a particular first communication device of the plurality of first communication devices indicating which of the plurality of test wireless radar signals the particular first communication device successfully measured; and transmit at least one of the second indications indicating a transmit power to be used by a particular second communication device of the plurality of second communication devices based on the sixth indication.

Another example radar server includes: means for receiving, from each of a plurality of first communication devices, a first indication of a capability of a respective one of the plurality of first communication devices to measure a first wireless radar signal; means for determining, based on the first indication from each of the plurality of first communication devices, at least a subset of the plurality of first communication devices to act as wireless radar signal receivers; means for transmitting second indications to a plurality of second communication devices indicating to transmit second radar signals; and means for transmitting third indications to the at least a subset of the plurality of first communication devices indicating to receive the second radar signals.

Implementations of such a radar server may include one or more of the following features. The means for transmitting the second indications include means for transmitting the second indications with each of at least one of the second indications indicating a transmit power to be used by a respective communication device of the plurality of second communication devices. The radar server includes means for transmitting one or more fourth indications to establish a respective training phase window for one or more of the plurality of first communication devices to use to determine the first indication. The radar server includes means for transmitting a fifth indication to each of at least a subset of the plurality of second communication devices indicating to transmit a plurality of test wireless radar signals each with a different transmit power. The radar server includes means for receiving a sixth indication from a particular first communication device of the plurality of first communication devices indicating which of the plurality of test wireless radar signals the particular first communication device successfully measured, and the means for transmitting the second indications include means for transmitting at least one of the second indications indicating a transmit power to be used by a particular second communication device of the plurality of second communication devices based on the sixth indication.

An example method of coordinating radar signaling by a server includes: receiving, at the server from each of a plurality of first communication devices, a first indication of a capability of a respective one of the plurality of first communication devices to measure a first wireless radar signal; determining, at the server based on the first indication from each of the plurality of first communication devices, at least a subset of the plurality of first communication devices to act as wireless radar signal receivers; transmitting, from the server, second indications to a plurality of second communication devices indicating to transmit second radar signals; and transmitting, from the server, third indications to the at least a subset of the plurality of first communication devices indicating to receive the second radar signals.

Implementations of such a method may include one or more of the following features. Transmitting the second indications includes transmitting the second indications with each of at least one of the second indications indicating a transmit power to be used by a respective communication device of the plurality of second communication devices. The method includes transmitting one or more fourth indications to establish a respective training phase window for one or more of the plurality of first communication devices to use to determine the first indication. The method includes transmitting a fifth indication to each of at least a subset of the plurality of second communication devices indicating to transmit a plurality of test wireless radar signals each with a different transmit power. The method includes receiving a sixth indication from a particular first communication device of the plurality of first communication devices indicating which of the plurality of test wireless radar signals the particular first communication device successfully measured, and transmitting the second indications includes transmitting at least one of the second indications indicating a transmit power to be used by a particular second communication device of the plurality of second communication devices based on the sixth indication.

Another example non-transitory, processor-readable storage medium includes processor-readable instructions configured to cause a processor of a server to: receive, from each of a plurality of first communication devices, a first indication of a capability of a respective one of the plurality of first communication devices to measure a first wireless radar signal; determine, based on the first indication from each of the plurality of first communication devices, at least a subset of the plurality of first communication devices to act as wireless radar signal receivers; transmit second indications to a plurality of second communication devices indicating to transmit second radar signals; and transmit third indications to the at least a subset of the plurality of first communication devices indicating to receive the second radar signals.

Implementations of such a storage medium may include one or more of the following features. The processor-readable instructions configured to cause the processor to transmit the second indications include instructions configured to cause the processor to transmit the second indications with each of at least one of the second indications indicating a transmit power to be used by a respective communication device of the plurality of second communication devices. The storage medium includes processor-readable instructions configured to cause the processor to transmit one or more fourth indications to establish a respective training phase window for one or more of the plurality of first communication devices to use to determine the first indication. The storage medium includes processor-readable instructions configured to cause the processor to transmit a fifth indication to each of at least a subset of the plurality of second communication devices indicating to transmit a plurality of test wireless radar signals each with a different transmit power. The storage medium includes processor-readable instructions configured to cause the processor to receive a sixth indication from a particular first communication device of the plurality of first communication devices indicating which of the plurality of test wireless radar signals the particular first communication device successfully measured, and the processor-readable instructions configured to cause the processor to transmit the second indications include instructions configured to cause the processor to transmit at least one of the second indications indicating a transmit power to be used by a particular second communication device of the plurality of second communication devices based on the sixth indication.

DETAILED DESCRIPTION

Figure 1:
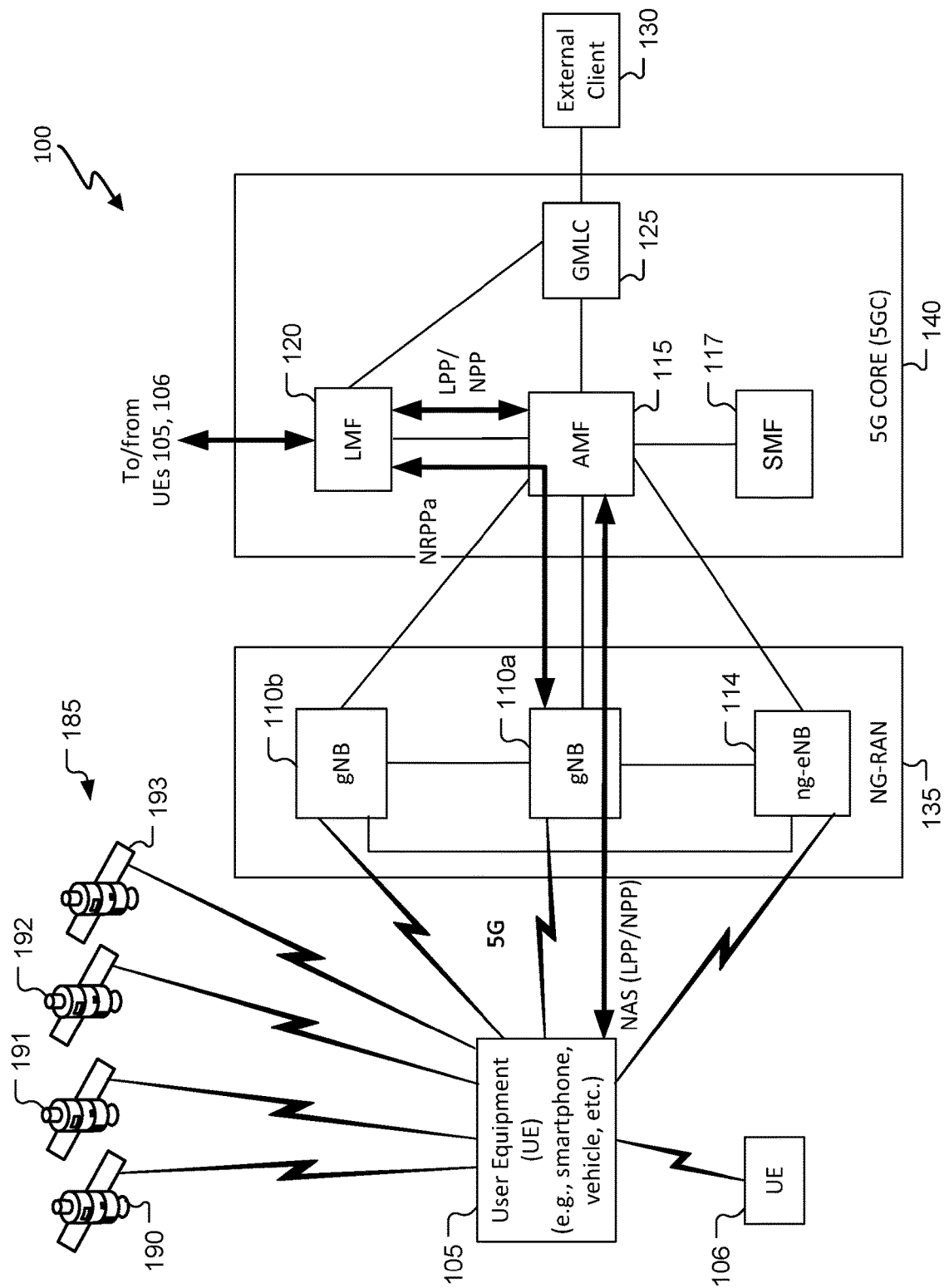
FIG. 1 is a simplified diagram of an example wireless communications system.

Techniques are discussed herein for managing radar signaling. For example, communication devices (e.g., one or more base stations and/or one or more UEs) report capability information regarding the capability of each of the devices to measure radar signals that are within a frequency range of wireless communication. The wireless communication frequency range may be, for example, for cellular communication, WiFi communication, and/or another type of wireless communication (e.g., in one or more licensed and/or unlicensed frequency bands). The capability information may include a sensitivity level and/or a saturation level of the respective device. The communication devices report the capability information to a radar server. The radar server uses the reported information to coordinate radar signaling, e.g., which devices to use as radar signal transmitters and at what transmission power levels, and which devices to use as radar signal receivers. Measurements of the received radar signals are reported to the radar server and the radar server, e.g., a location server, determines position information of one or more reflectors based on the measurements. These are examples, and other examples may be implemented.

Items and/or techniques described herein may provide one or more of the following capabilities, as well as other capabilities not mentioned. Communication components may be used for communication and for radar positioning. Positioning and/or motion detecting using communication-frequency signals may be performed for objects displaced far from communication devices. Energy may be saved by avoiding transmitting signals that cannot be measured and/or attempting to measure signals that cannot be measured. Energy may be saved by transmitting radar signals efficiently, e.g., transmitting radar signals with enough transmission power to be measured without using excess transmission power. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. The BSs 110a, 110b, 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more of the BSs 110a, 110b, 114 may be configured to communicate with the UE 105 via multiple carriers. Each of the BSs 110a, 110b, 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although only one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the BSs 110a, 110b, 114 and/or the network 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples only as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the BSs 110a, 110b, 114, the core network 140, and/or the external client 130. For example, such other devices may include internet of thing (IoT) devices, medical devices, home entertainment and/or automation devices, etc. The core network 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The BSs 110a, 110b, 114 may each comprise one or more TRPs. For example, each sector within a cell of a BS may comprise a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the BSs 110a, 110b, 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematics (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the core network 140, and may provide QoS (Quality of Service) flow and session management. The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS transmissions from the gNBs 110*a*, 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS beams from a plurality of base stations (such as the gNBs 110*a*, 110*b*, the ng-eNB 114, etc.) to compute the UE's position.

Figure 2:
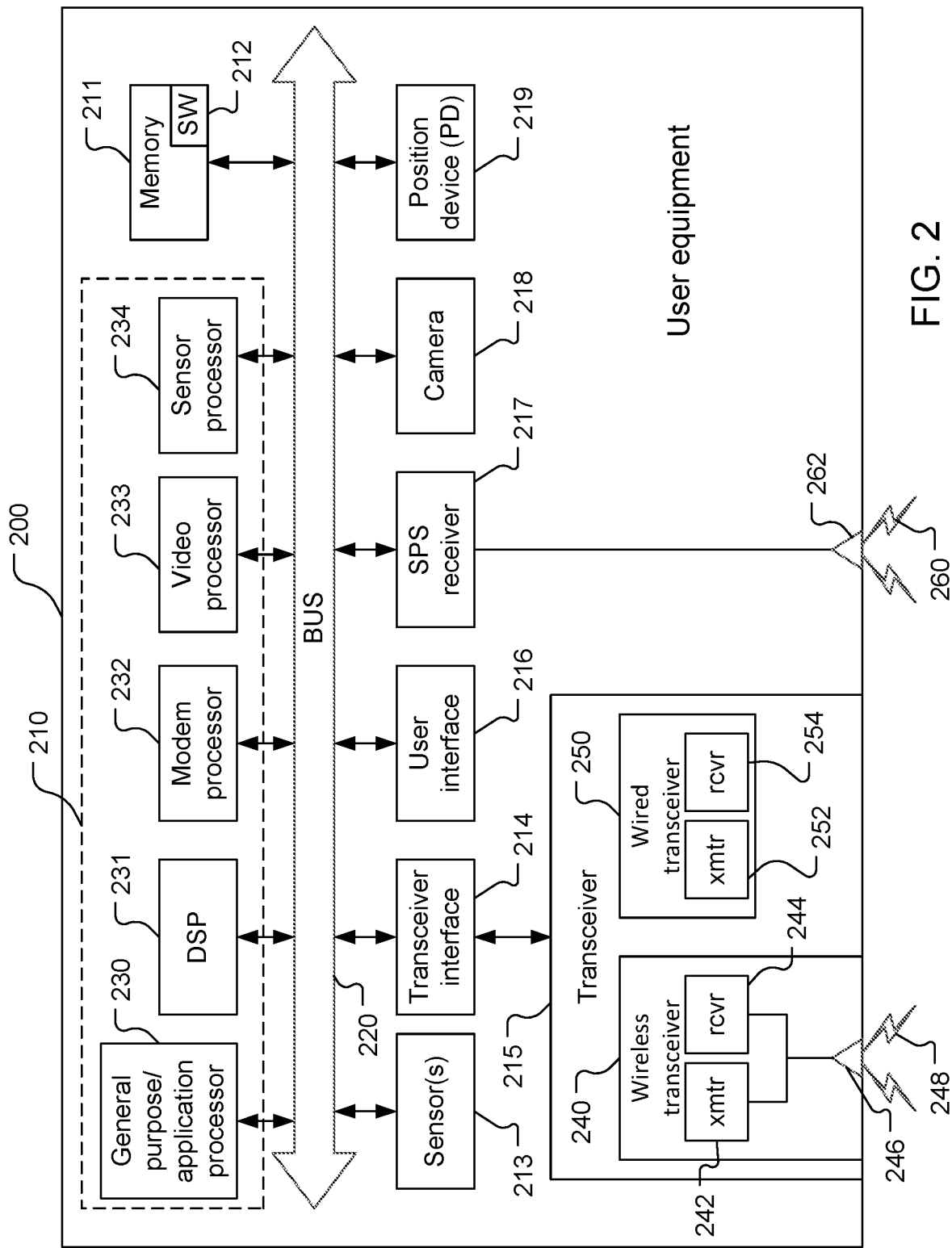
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s), the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the network 135 to send communications to, and receive communications from, the network 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless SPS signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer only to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general purpose/application processor 230, the transceiver 215, the SPS receiver 217, and/or another component of the UE 200, and may be provided by hardware, software, firmware, or various combinations thereof.

Figure 3:
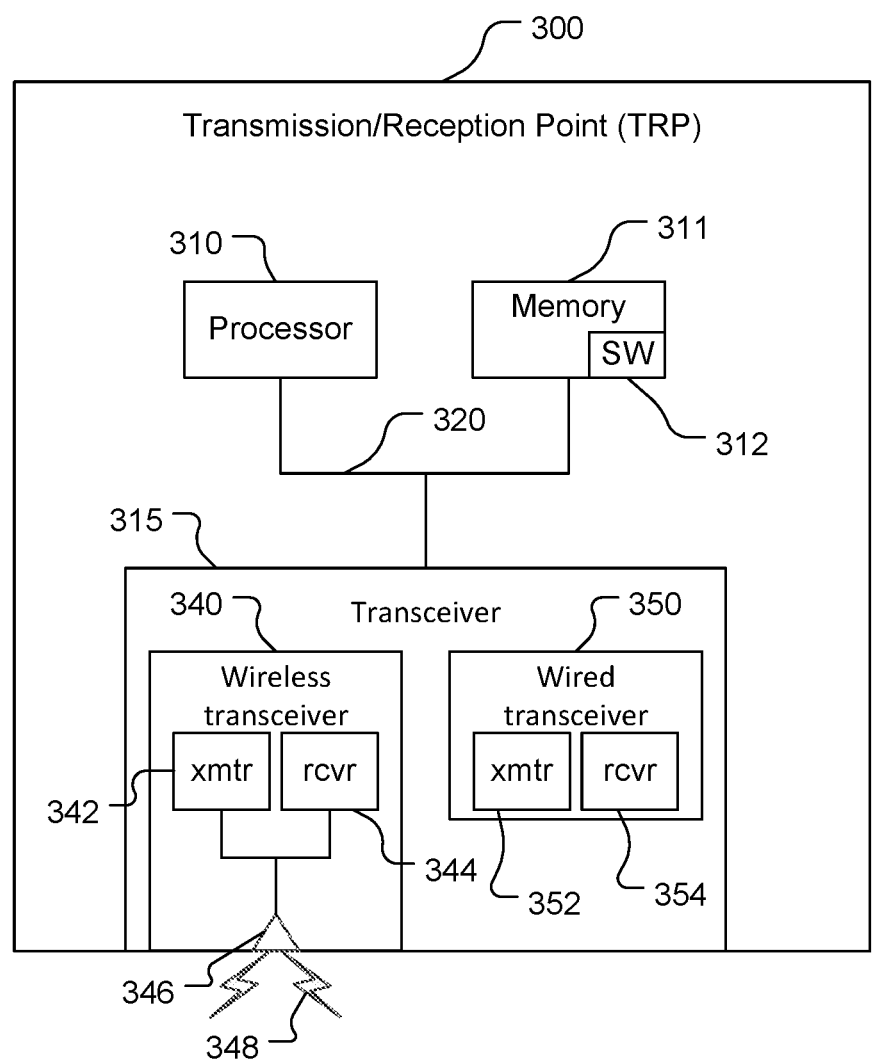
FIG. 3 is a block diagram of components of an example transmission/reception point shown in FIG. 1.

Referring also to FIG. 3, an example of a TRP 300 of the BSs 110*a*, 110*b*, 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer only to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the BSs 110*a*, 110*b*, 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the network 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
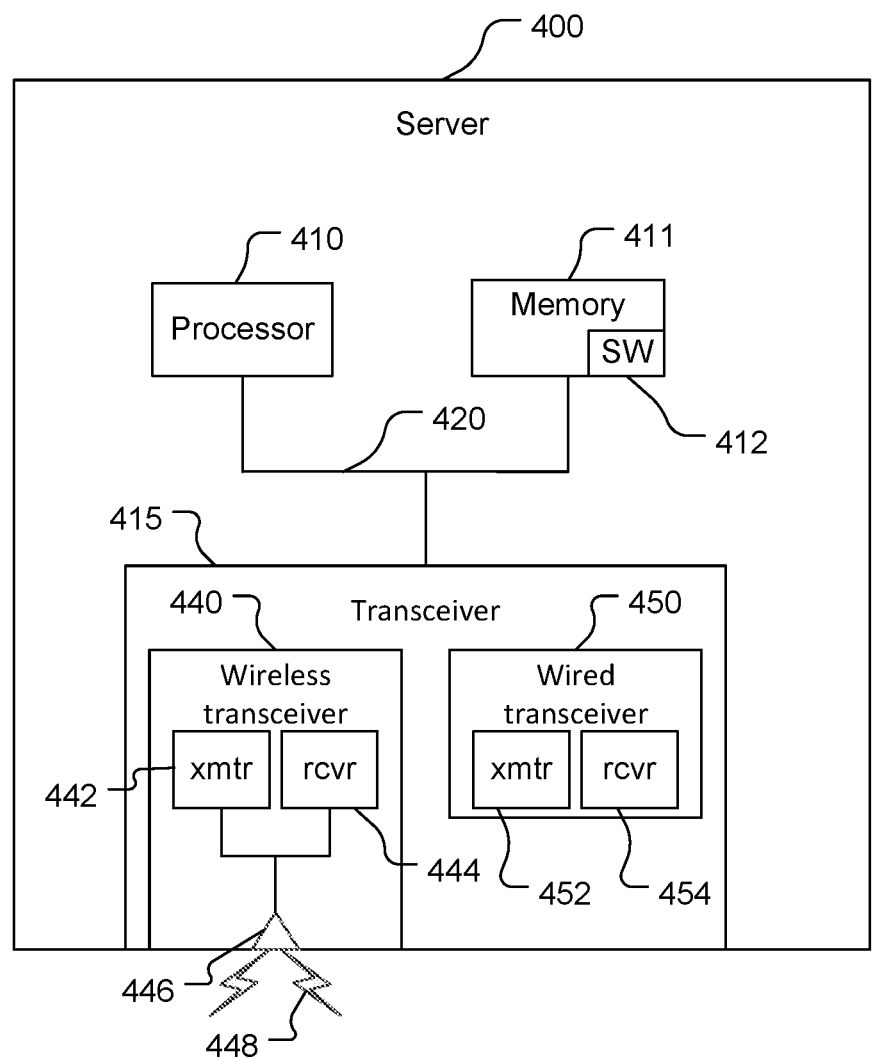
FIG. 4 is a block diagram of components of an example server shown in FIG. 1.

Referring also to FIG. 4, a server 400, which is an example of the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the network 135 to send communications to, and receive communications from, the TRP 300, for example, and/or one or more other entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer only to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that only the UEs subscribed to the service can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or wardriving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE $T_{Rx-Tx}$ or $UE_{Rx-Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS), may refer to one reference signal or more than one reference signal.

Positioning reference signals (PRS) include downlink PRS (DL PRS) and uplink PRS (UL PRS) (which may be called SRS (Sounding Reference Signal) for positioning). PRS may comprise PRS resources or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-Resource-Set, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that may be in multiple Resource Blocks (RBs) within N (one or more) consecutive symbol(s) within a slot. An RB is a collection of REs spanning a quantity of one or more consecutive symbols in the time domain and a quantity (12 for a 5G RB) of consecutive subcarriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

WiFi and Communication-Device RF Sensing

WiFi signaling can be used for channel-capture-based RF sensing. For example, referring to FIG. 5, in a monostatic WiFi RF sensing system 500, a WiFi device 510 transmits a transmitted WiFi RF signal 520 from a transmit antenna 512. The transmitted signal 520 is incident upon a target device 530 and reflects as a reflected signal 540 that is received by a receive antenna 514 of the WiFi device 510. In addition to the reflected signal 540 received by the receive antenna 514 of the WiFi device, a leakage signal 550 travels directly from the transmit antenna 512 to the receive antenna 514. The leakage signal 550, typically traveling less distance that the transmitted signal 520 and the reflected signal 540, may be a strong signal when received by the receive antenna 514, potentially overwhelming the reflected signal 540, saturating the WiFi device 510. The leakage between transmitter and receiver may be reduced by using a bistatic radar system or a multistatic radar system. Referring also to FIG. 6, a bistatic radar system 600 has a transmitter 610 and a receiver 620 that are displaced from each other by a distance 640 comparable to an expected distance 650 from the transmitter 610 to a target 630. In a multistatic radar system, more than one transmitter and/or more than one receiver are included in the system.

Communication-Device Radar Capability Reporting and Radar Coordination

Figure 7:
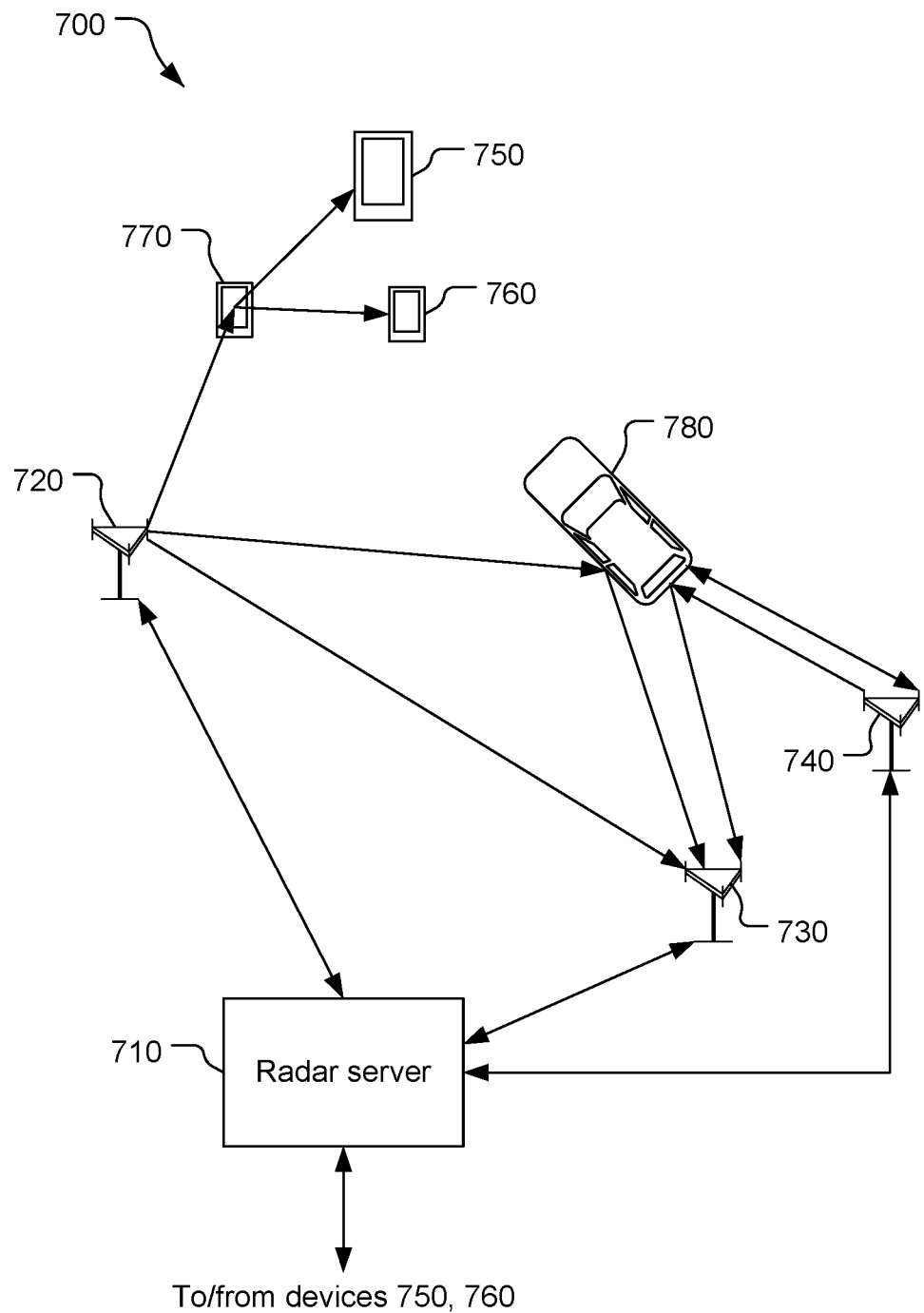
FIG. 7 is an example environment of radar signaling.

Referring to FIG. 7, a communication-device radar system 700 includes a radar server 710, base stations 720, 730, 740, UEs 750, 760, and reflectors 770, 780. In this example, the reflector 770 is a UE and the reflector 780 is a vehicle. The base stations 720, 730, 740 (e.g., examples of the TRP 300) transmit signals that are reflected by the reflectors 770, 780, and the reflections received by the UEs 750, 760 and the base stations 730, 740. The base stations 730, 740 and the reflector 780 form monostatic radar systems. The base station 720, the reflector 770, and the UEs 750, 760 form a multistatic radar system, with the UEs 750, 760 nearby the reflector 770 measuring reflections for crowd-sourcing purposes. The base station 720, the reflector 780, and the base station 730 form a bistatic radar system as does the base station 740, the reflector 780, and the base station 730. The radar server 710 coordinates which entities in the system 700 transmit radar signals and which entities are used to measure radar signals and report corresponding measurements and/or other information (e.g., a result of processing a measurement).

Various signal properties may be considered for reference signals for radar in a communication-device radar system. For example, spacing both in time and frequency of resource elements (REs) sounded in the reference signal, as well as total time duration and total bandwidth spanned by the REs may affect performance of the radar system. For example, uniformly spacing the sounded REs in frequency may facilitate robust and efficient time-domain based processing for ToA detection, similar to PRS. Uniformly spacing the sounded REs in time may facilitate Doppler-domain-based processing for Doppler shift detection. A long-time duration spanned by the sounded REs may help provide coverage enhancement and high Doppler resolution, and a small time separation between sounded REs help provide a large maximum resolvable Doppler. A large bandwidth helps provide good time resolution, and a small frequency separation between sounded REs (e.g., a small comb number or fully-staggered signal) help provide a large maximum resolvable delay. A minimum delay resolution is a function of the total bandwidth spanned by the sounded REs (e.g., min delay resolution=1/(4*total bandwidth)) and a maximum resolvable delay is a function of a frequency spacing of the sounded REs (e.g., max resolvable delay=1/(4*frequency spacing)). A minimum Doppler resolution is a function of a total time spanned by the sounded REs (e.g., min Doppler resolution=1000/(4*total duration)) and a maximum resolvable Doppler is a function of the time spacing of the sounded REs (e.g., max resolvable Doppler=1000/(4*time spacing)). Examples of two sets of reference signal parameters along with corresponding minimum velocity resolutions, maximum velocities, minimum distance resolutions, and maximum distances are provided in Table 1 below.

TABLE 1

|  | Example 1 | Example 2 |
| --- | --- | --- |
| $f_c$ | 4 GHz | 77 GHz |
| Bandwidth | 100 MHz | 400 MHz |
| Slot duration | 0.5 ms | 0.125 ms |
| # Slots | 40 | 8 |
| SCS | 30 kHz | 120 kHz |
| Spacing in freq | Comb-4 | Comb-4 |
| Symbols/slot | 2 | 7 |
| Min vel res | 3.375 km/h | 3.5 km/h |
| Max velocity | 270 km/h | 196 km/h |
| Min dist res | 0.75 m | 0.2 m |
| Max distance | 625 m | 156 m |

Various techniques may be implemented to facilitate communication-device radar. Entities capable of processing communication-frequency radar signals (which may include dual-purpose signals, e.g., data signals used for radar purposes) may report their capabilities to measure radar signals. The capability may include a saturation level and/or a sensitivity level of a respective entity. A radar server (which may be a location server) may use the capabilities of the entities to coordinate radar signaling by determining which entities to use to receive radar signals, and which entities to use to transmit radar signals and possibly at what transmit powers. The radar server may select entities to use for radar signal reception and entities to use for radar signal transmission beyond the entities that reported their radar capabilities.

Figure 8:
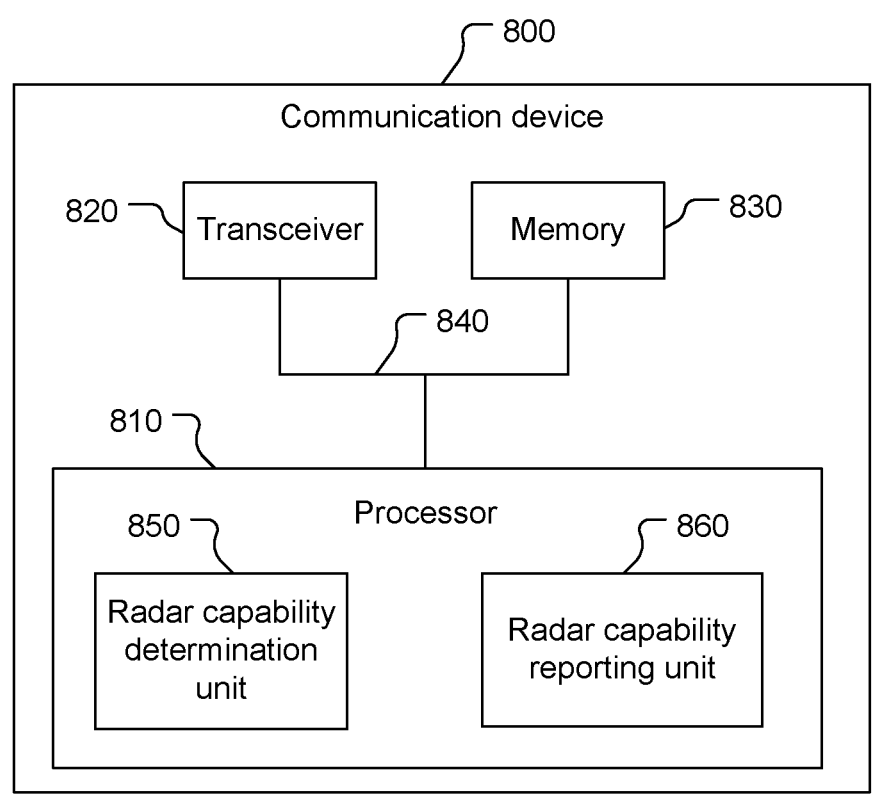
FIG. 8 is a block diagram of components of a communication device.
Figure 9:
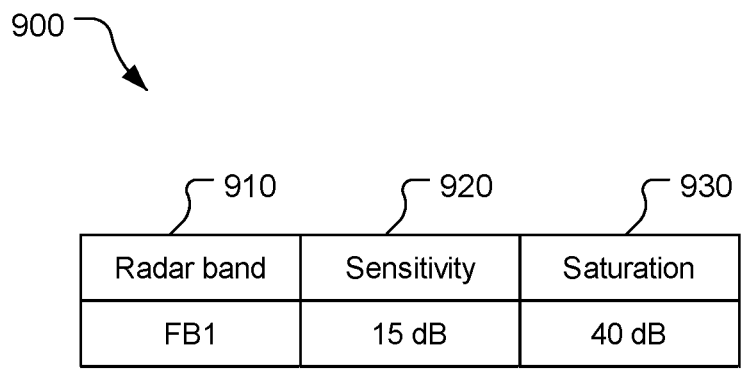
FIG. 9 is an example capability message of communication device capability for measuring communication-frequency radar signals based on frequency band.

Referring to FIG. 8, with further reference to FIGS. 1-4, a communication device 800 includes a processor 810, a transceiver 820, and a memory 830 communicatively coupled to each other by a bus 840. The communication device 800 may be a UE, a TRP, or another entity capable of communication and radar signaling using communication frequencies, e.g., cellular communication frequencies and/or other communication frequencies, whether licensed or unlicensed. Thus, the communication device 800 may be a cellular communication device. The communication device 800 may include the components shown in FIG. 5, and may include one or more other components such as any of those shown in FIG. 2 such that the UE 200 may be an example of the communication device 800. For example, the processor 810 may include one or more of the components of the processor 210. The transceiver 820 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the transceiver 820 may include the wired transmitter 252 and/or the wired receiver 254. The memory 830 may be configured similarly to the memory 211, e.g., including software with processor-readable instructions configured to cause the processor 810 to perform functions. The communication device 800 may include any of the components shown in FIG. 3 such that the TRP 300 may be an example of the communication device 800.

The description herein may refer only to the processor 810 performing a function, but this includes other implementations such as where the processor 810 executes software (stored in the memory 830) and/or firmware. The description herein may refer to the communication device 800 performing a function as shorthand for one or more appropriate components (e.g., the processor 810 and the memory 830) of the communication device 800 performing the function. The processor 810 (possibly in conjunction with the memory 830 and, as appropriate, the transceiver 820) includes a radar capability determination unit 850 and a radar capability reporting unit 860. The determination unit 850 and the reporting unit 860 are discussed further below, and the description may refer to the processor 810 generally, or the communication device 800 generally, as performing any of the functions of the determination unit 850 and/or the reporting unit 860.

The determination unit 850 is configured to determine one or more parameters indicative of the capability of the communication device 800 to measure a radar signal. Reflected signals may be received by the transceiver 820 (e.g., of a gNB or UE) with very high attenuation. A sensitivity level for the device 800 to be able to measure the reflected signals (e.g., to receive and distinguish the reflected signals from noise) and/or a saturation level to be able to measure the reflected signals and represent the measurement accurately (e.g., without clipping) may depend on several measurement capability factors. Such factors may include: a frequency band or frequency band combination used to receive the reflected signals; a frequency band or frequency band combination used for communication (e.g., data) by the device 800 concurrently with the frequency band or frequency band combination used to receive the reflected signals; a frequency-domain gap between resources used to measure the reflected signals and the resources used to receive or transmit other signals; a receive chain, receive panel, and antenna element(s) used by the device 800 to receive the reflected signals; signal blockage; and/or functionality of one or more device components (e.g., RF components, filters, ADC (analog-to-digital converter) bit length). While some leakage will typically occur between separate REs, leakage between analog filters for radar signals and non-radar signals may increase as the frequency gap gets smaller, making a noise floor higher. The radar capability determination unit 850 may be configured to determine the capability of the device 800 to measure a radar signal (e.g., determine the sensitivity level and/or the saturation level) by analyzing one or more of these factors. A factor may be static, being fixed by the configuration of the device 800 (e.g., the design and fabrication of the components of the device 800) or dynamic, varying over time (e.g., which components are presently used and/or a signal level presently received). Dynamic factors include the band/band combination used (for radar and/or for other signaling), the Rx chain/Rx panel/antenna element(s) used, and/or the blockage. An example of a static factor is the ADC bit length, although the saturation level may vary in absolute terms as the saturation level may be a fixed value relative to a strongest signal being received, and the magnitude of the strongest received signal may vary over time.

The sensitivity level may be an absolute or relative value. For example, the sensitivity level of the device 800 may be a dBm value or a relative value, e.g., relative to a noise floor such as 10 dB above a thermal noise floor. The saturation level may be a relative value, e.g., relative to a strongest received signal because the saturation level may be a function of a dynamic range of an ADC that will process received signals. For example, a saturation level may be 40 dB or 50 dB relative to a strongest received signal, i.e., such that signals over a range of 40 dB or 50 dB may be concurrently received and measured, and strengths of the signals accurately represented. The saturation level may be a maximum difference between signals that can be measured accurately and processed in view of a present value of SINR (Signal to Interference and Noise Ratio). For example, a saturation level may be a relative difference between (e.g., a ratio of) a received reflected radar signal (e.g., the reflected signal 540) and a received leakage radar signal (e.g., the leakage signal 550). As another example, a saturation level may be relative difference between (e.g., a ratio of) a received reflected radar signal (e.g., the reflected signal 540) and a received wireless data signal (e.g., the leakage signal 550 or a data signal from another device).

The radar capability reporting unit 860 is configured to report the capability of the device 800 to measure communication-device radar signals, e.g., as determined by the radar capability determination unit 850 due to static or dynamic factors. The reporting unit 860 may be configured to support dynamic (ad hoc, on demand), semi-persistent, periodic, and/or capability-type signaling of the capability of the device 800 to measure radar signals, e.g., as indicated by one or more measurement capability parameters such as sensitivity level and/or saturation level. Semi-persistent reporting comprises periods of periodic reporting with the periods being aperiodic, e.g., triggered in an on-demand, ad hoc manner. Capability-type reporting may be independent of a request for the measurement capability of the device 800, and may be more static than in response to a request. Dynamic reporting is in response to a request (e.g., from the server 710) for present measurement capability of the device 800, possibly in view of one or more parameters (e.g., specified by the server 710). The reporting of the measurement capability may be associated with any of the measurement capability factors discussed above, or associated with a combination of two or more of the measurement capability factors. Thus, the measurement capability may be conditional, with a specified capability being for one or more specified factors and/or values of the factors.

Figure 10:
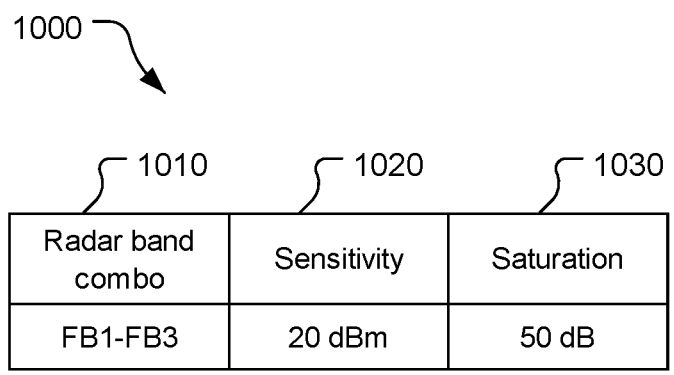
FIG. 10 is an example capability message of communication device capability for measuring communication-frequency radar signals based on frequency band combination.
Figure 11:
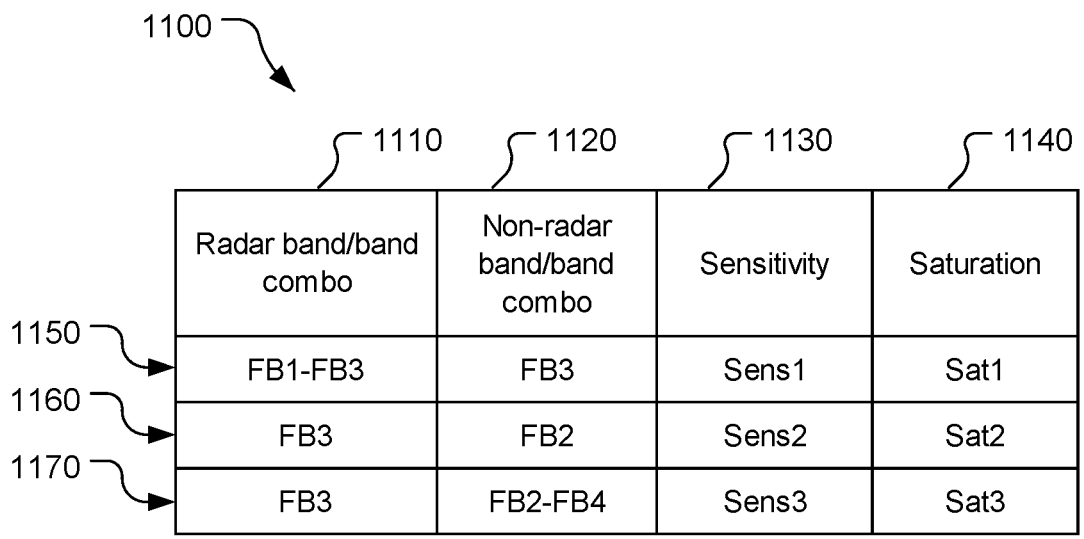
FIG. 11 is an example capability message of communication device capability for measuring communication-frequency radar signals based on frequency band or band combination used for radar signaling and frequency band or band combination used for data communication.
Figures 12, 13:
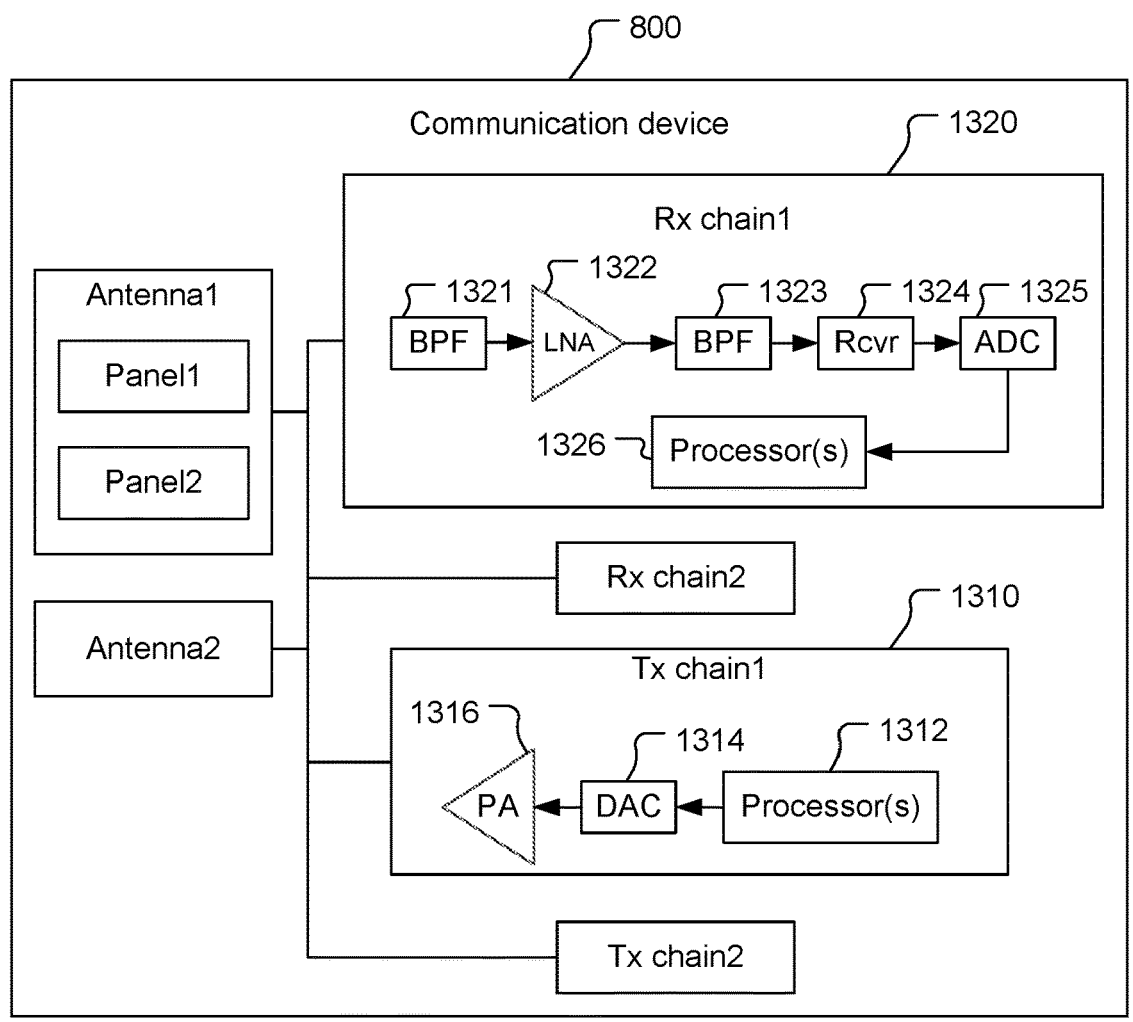
FIG. 12 is an example capability message of communication device capability for measuring communication-frequency radar signals based on transmission and reception pair signaling.
FIG. 13 is a block diagram of antennas, antenna panels, and radio-frequency chains of the communication device shown in FIG. 8.

The reporting unit 860 may be configured to report measurement capability of the device 800 in one or more of a variety of ways as appropriate. For example, referring also to FIG. 10, the reporting unit 860 may report measurement capability per radar frequency band, with an example report 900 including a radar frequency band 910, a sensitivity 920 corresponding to the radar frequency band 910, and a saturation 930 corresponding to the radar frequency band 910. The report 900 is an example and not limiting of the disclosure. For example, only one of the sensitivity 920 or the saturation 930 may be provided, or another indication of measurement ability of the device 800. In the report 900, the sensitivity 920 is provided as a relative value, e.g., 15 dB relative to a noise floor, and the saturation 930 is provided as a relative value, e.g., 40 dB from a strongest received signal power. As another example, referring also to FIG. 10, the reporting unit 860 may report measurement capability per radar frequency band combination, with an example report 1000 including the radar frequency band combination 1010, a sensitivity 1020, and a saturation 1030. As another example, referring also to FIG. 11, the reporting unit 860 may report measurement capability per radar frequency band or band combination, per non-radar frequency band or band combination, with an example report 1100 including the radar frequency band or band combination 1110, non-radar frequency band or band combination 1120, a sensitivity 1130, and a saturation 1140. The report 1100 in this example includes three entries 1150, 1160, 1170. One or more of the entries 1150, 1160, 1170 may omit the sensitivity 1130 or the saturation 1140 (or both if another measurement capability indicator is provided), and any particular entry may include a radar band or band combination, and a non-radar band or band combination. The report 1100 is an example only, as the report 1100 may include more or fewer entries (e.g., a single entry). As another example, referring also to FIGS. 12 and 13, the reporting unit 860 may report measurement capability per receive antenna, receive panel (including multiple antenna elements), and/or receive chain used to receive the radar signals, or (for a monostatic system) pairing of receive antenna, receive panel, and/or receive chain and transmit antenna, transmit panel, and/or transmit chain used to transmit the radar signals. A report 1200 includes a transmit field 1210, a receive field 1220, a sensitivity field 1230, and a saturation field 1240. The fields 1210, 1220 may, however, be omitted with the sensitivity 1230 and/or the saturation 1240, that depend(s) on the transmit and receive components used, reported without explicitly indicating the transmit or receive components used. The transmit field 1210 indicates a transmit antenna, a transmit panel, and/or a transmit chain used to transmit radar signals and the receive field 1220 indicates a receive antenna, a receive panel, and/or a receive chain used to transmit radar signals. As shown in FIG. 13, a transmit chain 1310 includes one or more processors 1312, a digital-to-analog converter (DAC) 1314, and a power amplifier 1316, although other components (e.g., one or more filters) may be included in the transmit chain 1310. A receive chain 1320 includes bandpass filters 1321, 1323, a low-noise amplifier (LNA) 1322, a receiver 1324, an ADC 1325, and one or more processors 1326. As another example, referring also to FIG. 14, the reporting unit 860 may report measurement capability per radar signal resource, per radar signal resource set, and/or per radar signal frequency layer, with an example report 1400 including the radar signal resource, resource set, and/or frequency layer 1410, a sensitivity 1420, and a saturation 1430. The reports 900, 1000, 1100, 1200, 1400 are examples only, and other configurations of reports may be used. For example, one or more measurement capability indications (e.g., sensitivity and/or saturation) may be provided without an associated qualifying indication (e.g., frequency band, band combination, Tx/Rx pairing, etc.). The capability indication(s) may be, for example, the lowest corresponding level for the device 800 to measure a radar signal accurately regardless of other factors. As another example, a device type of the device 800 may be provided, with the device type corresponding to one or more radar signal measurement capability values. For example, an industry standard (e.g., issued by the 3GPP) may specify one or more capabilities (e.g., sensitivity level and/or saturation) corresponding to a device type such that reporting of the device type guarantees the corresponding capabilities. For example, a sensitivity may be specified for each of one or more frequency gaps such that the sensitivity may not be reported by the device 800 for one or more frequency gaps.

Figure 5:
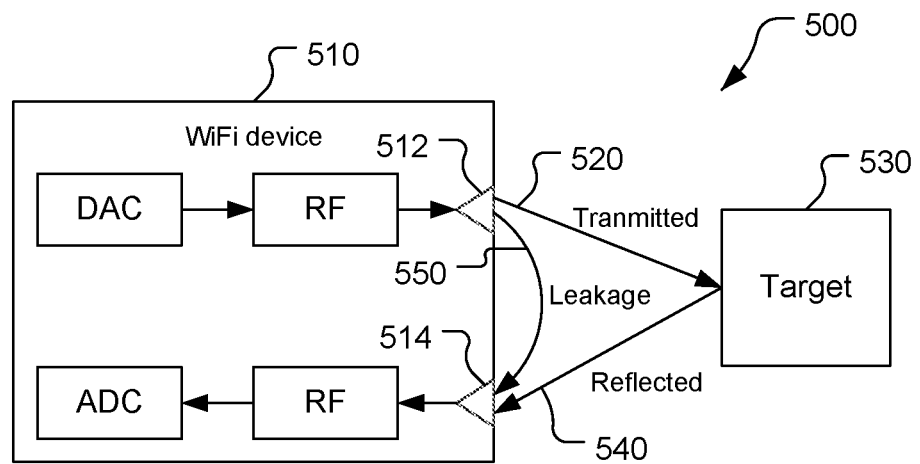
FIG. 5 is a block diagram of a monostatic radar system.
Figure 6:
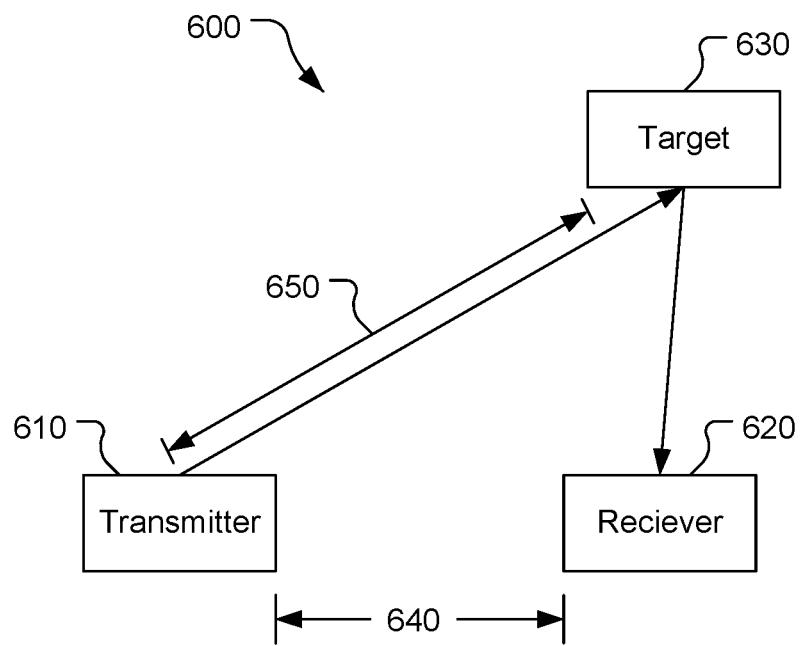
FIG. 6 is a block diagram of a bistatic radar system.
Figure 14:
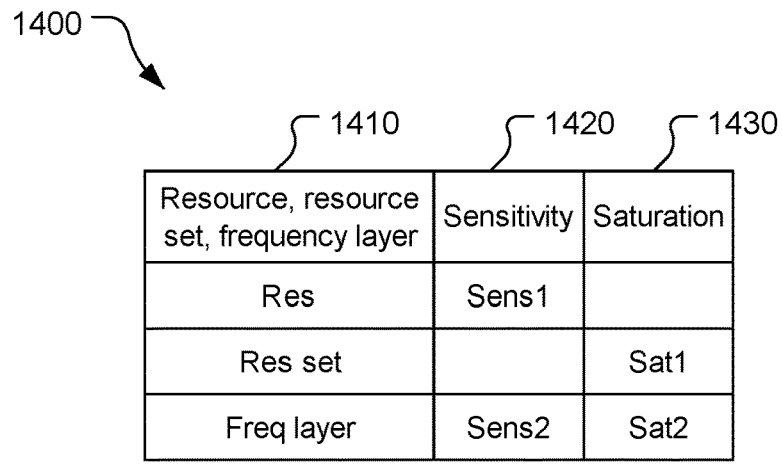
FIG. 14 is an example capability message of communication device capability for measuring communication-frequency radar signals based on radar signal resource, resource set, and/or frequency layer.

As shown in FIG. 5, in monostatic radar, the transmitted signal 520 causes a leakage signal 550 that produces some interference to the signal received by the same device, e.g., the reflected signal 540. For a monostatic communication-device radar system, the reporting unit 860 may be configured to report one or more indications of the leakage amount in one or more of a variety of formats. For example, the reporting unit 860 may report a saturation level or leakage amount in the form of capability reporting, configuration, or type of device. The saturation, leakage, and/or interference caused may be reported as a function of the transmit power used by the transceiver 820. The reporting unit 860 may be configured to report the one or more indications per band, per band combination, per band in band combination (i.e., each band in a band combination), per Tx/Rx pair signaling (e.g., as shown in FIG. 12), or per radar signal resource, radar signal resource set, and/or radar signal frequency layer (e.g., as shown in FIG. 14).

Figure 15:
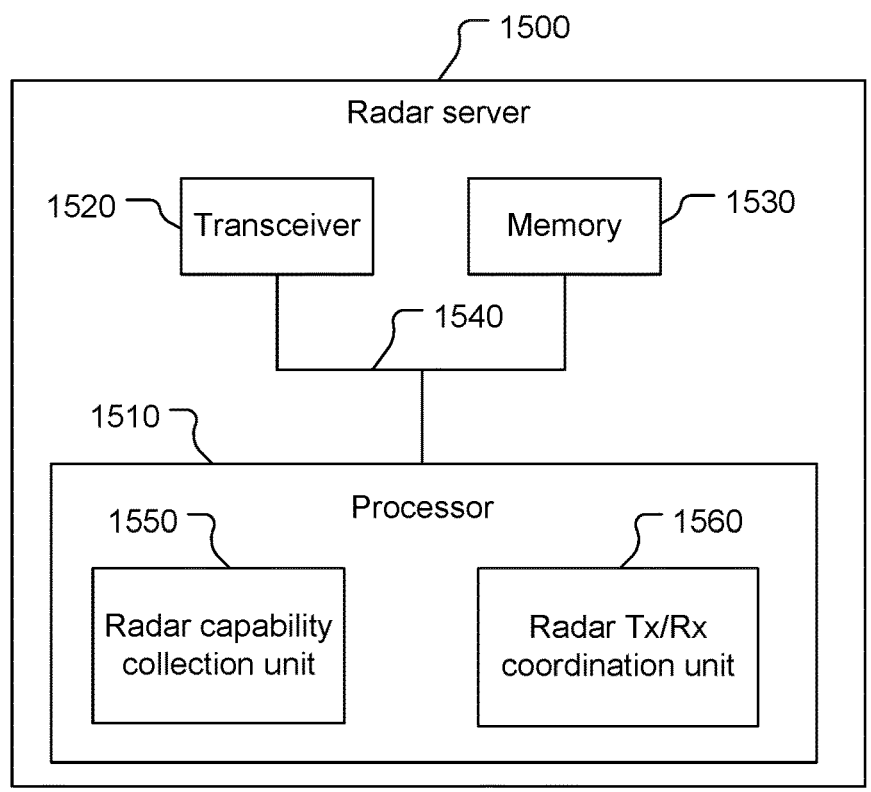
FIG. 15 is a block diagram of components of a radar server.

Referring to FIG. 15, with further reference to FIGS. 1-4, a server 1500 includes a processor 1510, a transceiver 1520, and a memory 1530 communicatively coupled to each other by a bus 1540. The server 1500 may include the components shown in FIG. 4 such that the server 400 may be an example of the server 1500. The transceiver 1520 may include one or more of the components of the transceiver 415, e.g., the wireless transmitter 442 and the antenna 446, or the wireless receiver 444 and the antenna 446, or the wireless transmitter 442, the wireless receiver 444, and the antenna 446. Also or alternatively, the transceiver 1520 may include the wired transmitter 452 and/or the wired receiver 454. The memory 1530 may be configured similarly to the memory 411, e.g., including software with processor-readable instructions configured to cause the processor 1510 to perform functions.

The description herein may refer only to the processor 1510 performing a function, but this includes other implementations such as where the processor 1510 executes software (stored in the memory 1530) and/or firmware. The description herein may refer to the server 1500 performing a function as shorthand for one or more appropriate components (e.g., the processor 1510 and the memory 1530) of the server 1500 performing the function. The processor 1510 (possibly in conjunction with the memory 1530 and, as appropriate, the transceiver 1520) includes a radar capability collection unit 1550 and a radar Tx/Rx coordination unit 1560. The collection unit 1550 and the coordination unit 1560 are discussed further below, and the description may refer to the processor 1510 generally, or the server 1500 generally, as performing any of the functions of the collection unit 1550 and/or the coordination unit 1560.

The collection unit 1550 is configured to request and collect radar capability information from communication devices. The collection unit 1550 may respond to a request for location of a UE by obtaining radar capability information for communication devices 800. The collection unit 1550 may obtain such information from the memory 1530 and/or from one or more of the communication devices 800. The collection unit 1550 may transmit one or more requests via the transceiver 1520 for the radar capability information as appropriate. The collection unit 1550 may collect the response(s) to the request(s) with the radar capability of each of the communication devices 800. To facilitate determination of the radar capability, the collection unit 1550 may schedule a respective guard period (also called a calibration window or training phase window) for each of one or more of the devices 800 during which the device 800 may determine one or more measures of the ability to receive radar signaling, e.g., to calibrate a receive automatic gain control (AGC) of the respective device 800. Guard periods may be of a variety of lengths, e.g., 10 ms. The collection unit 1550 may configure a device 800 with training phase windows in a periodic or semipersistent fashion, and/or may configure the device 800 with one or more training phase windows in a dynamic, on-demand fashion. The device 800 may use the training phase window to adjust/calibrate/determine the saturation level and/or sensitivity level (and/or another measure of ability to receive radar signaling) of the device 800. In a monostatic system, the device 800 may transmit and receive radar signals without measuring other signals during the guard period, postponing/stopping/canceling other procedures as appropriate. If the device 800 is a UE, then the server 1500 may configure the device 800 with one or more time-domain guard periods, or the device 800 may request the guard period(s), or the server 1500 may ask a serving TRP of the device 800 to configure the device 800 with the guard period(s). The device 800 may use the guard period to calibrate or determine a sensitivity level and/or a saturation level, and report the determined sensitivity level and/or saturation level to the server 1500. In a bi-static system, the server 1500 may request one or more devices 800 to monitor radar signals, and one or more other devices 800 to transmit radar signals with known, different (e.g., monotonically increasing) transmit powers (e.g., specific step sizes of power). The receiving devices 800 respond with which radar signals were received and may indicate other information, e.g., which radar signal(s) caused the respective device 800 to be saturated. The coordination unit 1560 may analyze the received information to determine which devices 800 to use to transmit radar signals (and at what powers), and which devices 800 to use to receive and measure radar signals and report the measurements, e.g., including which signals (resources, resource sets) to be measured, frequency of transmissions (periodicity), and offsets. The transmitted signals may have IDs, e.g., signal numbers, such that the devices 800 may report which signal IDs from which sources were received. Thus, the devices 800 may not know the transmit powers of the signals, but the server 1500 can determine the transmit powers that were received, and were received without saturating the receiving device 800. The server 1500 may thus determine a range of transmit powers from a source that can be received by a receiving device without saturating the receiving device. The coordination unit 1560 may transmit appropriate messages to the devices 800 to transmit radar signals (at indicated power levels) and/or to receive/measure/report radar signals.

Figure 16:
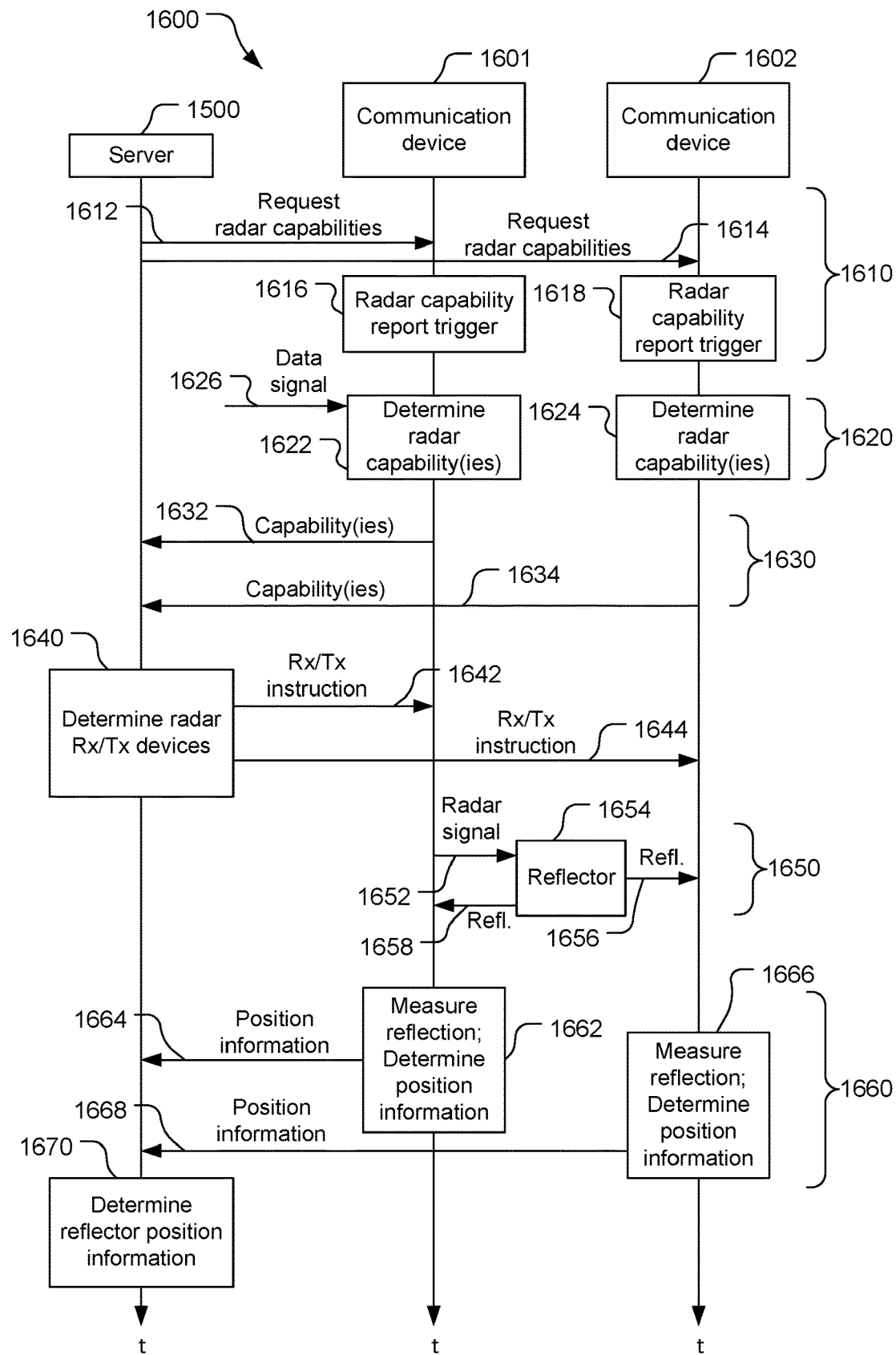
FIG. 16 is a signaling and process flow for determining position information using communication-frequency radar signaling.

Referring to FIG. 16, with further reference to FIGS. 1-15, a signaling and process flow 1600 for determining position information from combined processing of multiple PRS using a supplemental signal includes the stages shown. The flow 1600 is an example only, as stages may be added, rearranged, and/or removed.

At stage 1610, one or more triggers occur for triggering reporting of radar signal measurement capability by communication devices 1601, 1602 (e.g., cellular communication devices). The devices 1601, 1602 are examples of the communication device 800, e.g., being a UE or a base station (e.g., a gNB). Various forms of triggers may occur at stage 1610. For example, the server 1500 may transmit a request 1612 to the device 1601 and/or a request 1614 to the device 1602. Each of the requests 1612, 1614 request the devices 1601, 1602 to report to the server 1500 the capability of the respective device 1601, 1602 to serve as a receiver of radar signals (e.g., to measure and accurately report measurements of) radar signals. The server 1500 may transmit the requests 1612, 1614, for example, in response to receiving a request for location of a UE possibly within radar range of the devices 1601, 1602 and a determination by the server 1500 to use radar signaling (e.g., due to a determination that a desired location accuracy is unavailable absent use of radar signaling). The server 1500 may configure (or have the TRP(s) 300 serving the devices 1601, 1602 configure) one or more guard periods for the devices 1601, 1602 to use to determine respective radar capability(ies). At sub-stages 1616, 1618, one or more other triggers occur to cause the devices 1601, 1602 to report radar capability of the devices 1601, 1602, respectively, to serve as radar signal receivers.

At stage 1620, the communication devices 1601, 1602 determine respective radar capability(ies) at sub-stages 1622, 1624, respectively. The devices 1601, 1602 may analyze present conditions, e.g., presently-received signal(s) (e.g., radar signal(s), wireless data signal(s)), present thermal noise floor, presently-used RF components, and/or present transmit power, etc. to determine one or more indications of the capability of the devices 1601, 1602, respectively, to measure radar signals and represent the measurements accurately. For example, the determination unit 850 of each of the devices 1601, 1602 may use a guard period to receive (and transmit for a monostatic system) radar signals and determine sensitivity and/or saturation as a function of one or more factors such as those discussed above (e.g., band, band combination, RF components used (e.g., Tx/Rx pair, antenna, panel, RF chain, filter(s), etc.), blockage, ADC bit length, etc.). The determination unit 850 may determine a relative difference between a received reflected radar signal and a received leakage radar signal as an indication of a capability of the device 800 to measure a radar signal. The received leakage radar signal may be determined from a transmit power of the radar signal and a mapping of radar signal transmit power and received leakage power (e.g., programmed during device manufacture and/or empirically determined). As another example, the determination unit 850 may determine a relative difference between a received reflected radar signal and a received wireless data signal (e.g., the leakage signal 550 or a data signal 1626 from another device such as a TRP 300 or a UE).

At stage 1630, the devices 1601, 1602 report the determined capability(ies). The reporting unit 860 of each of the devices 1601, 1602 transmits a capability(ies) message 1632, 1634, respectively. One or more of the messages 1632, 1634 may include measurement values (e.g., sensitivity values and/or saturation values) such as shown in the reports 900, 1000, 1100, 1200, 1400. Also or alternatively, one or more of the messages 1632, 1634 may indicate one or more capabilities by indicating a device type of the respective device 1601, 1602, e.g., in accordance with an industry standard for the device type and corresponding capability(ies). One or more of the messages 1632, 1634 may indicate an inability of a corresponding device to measure radar signals.

At stage 1640, the server 1500 determines devices to transmit radar signals and devices to receive and measure reflections of the radar signals. The collection unit 1550 receives the capabilities messages 1632, 1634 and the coordination unit 1560 analyzes the information from the messages 1632, 1634 to determine which devices 800 to use to transmit radar signals, and parameters of the radar signals (e.g., transmit power, resources, resource sets, frequency layer, etc.). The coordination unit 1560 transmits instructions messages 1642, 1644 to the devices 1601, 1602, respectively, instructing the devices 1601, 1602 to operate as a radar signal transmitter and/or a radar signal receiver. In this example, the instruction message 1642 instructs the device 1601 to transmit and receive radar signals and the device 1602 to receive and measure reflections of radar signals transmitted by the device 1601. The instruction messages 1642, 1644 may include one or more parameters for the signals to be transmitted and/or received.

At stage 1650, the communication device 1601 transmits radar signals 1652. The radar signals 1652 are communication-frequency radar signals and may be dedicated radar signals or may be multi-use (e.g., dual use) signals for radar and at least one non-radar use, e.g., to convey data. The radar signals may be, for example, cellular-communication-frequency radar signals and/or radar signals of other frequencies, whether licensed or unlicensed. The radar signals 1652 may, for example, be PDSCH (Physical Downlink Shared Channel) signals, especially for monostatic radar systems because the transmitting device knows the pattern of the data transmitted and thus the pattern of the received/reflected signal. Further, PDSCH signals may have a long burst duration providing good Doppler resolution. The radar signals 1652 are incident upon a reflector 1654 (e.g., an object whose location is to be determined) and reflected into reflections 1656 that are received by the device 1602 and reflections 1658 that are received by the device 1601. Thus, the device 1601 is used in a monostatic fashion and the devices 1601, 1602 are used in a bistatic fashion.

At stage 1660, the devices 1601, 1602 measure the radar signals and transmit position information based on the measurements of the radar signals to the server 1500. For example, the processor 810 of each of the devices 1601, 1602 receives and measure the respective radar signal(s) at sub-stages 1662, 1666. The processor 810 determines one or more corresponding measurements, e.g., received power, etc. of the respective radar signal(s). The processor 810 determines position information, e.g., one or more of the one or more measurements and/or information determined from the measurement(s), e.g., pseudorange, ToA, RSRP, etc. The processor 810 of each of the devices 1601, 1602 transmits the position information in a respective position information message 1664, 1668 via the transceiver 820 to the server 1500.

At stage 1670, the server 1500 determines position information. For example, the processor 1510 uses position information from the position information messages 1664, 1668 to determine a location estimate for the reflector 1654, e.g., a UE. The processor 1510 may use position information from multiple communication devices 800 to improve the accuracy of the position information. The server 1500 may use radar-based position information and non-radar-based position information (e.g., based on PRS processing) to determine the position information at stage 1670.

Figure 17:
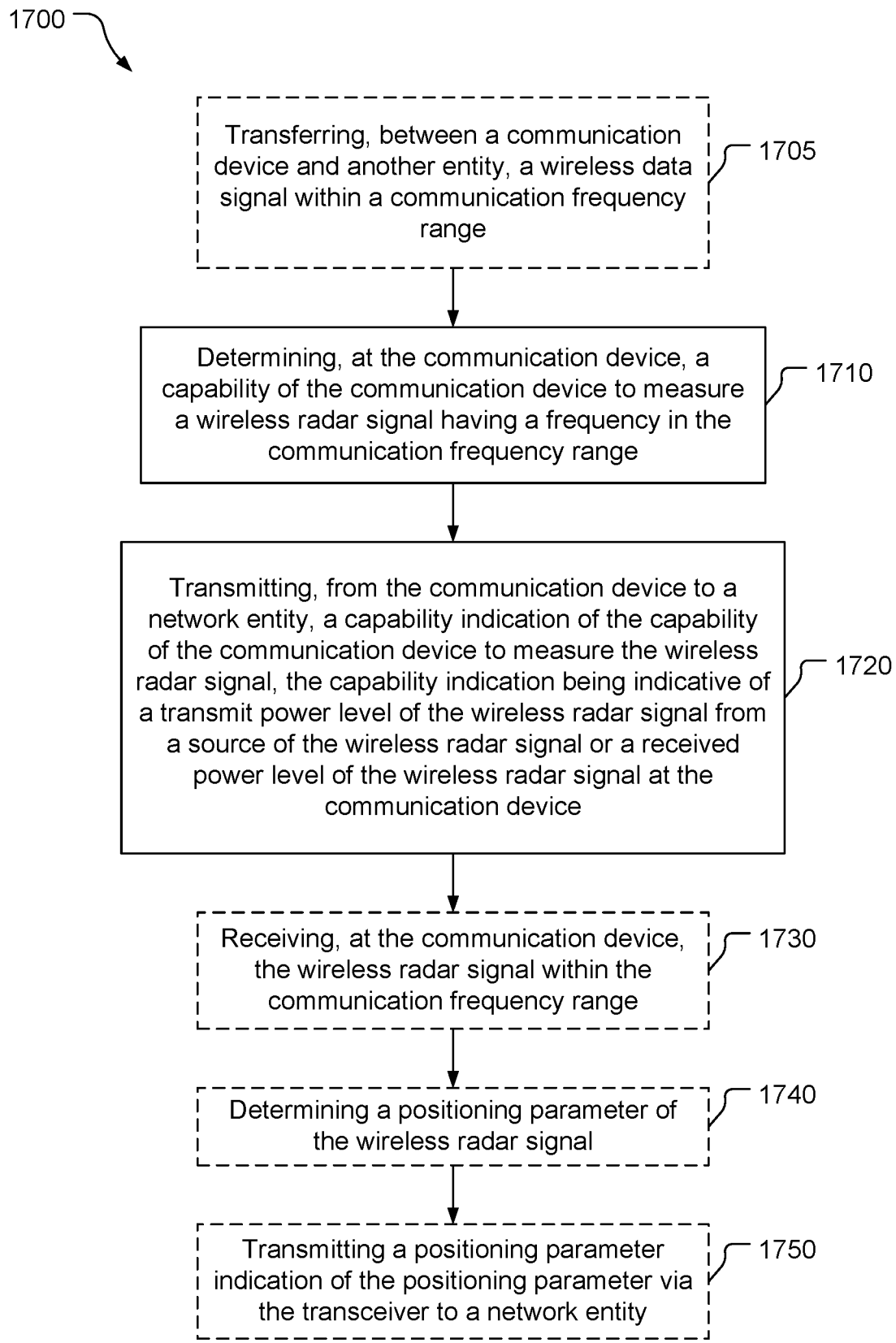
FIG. 17 is a block flow diagram of a method of reporting radar signal measuring capability.

Referring to FIG. 17, with further reference to FIGS. 1-16, a method 1700 of reporting radar signal measuring capability includes the stages shown. The method 1700 is, however, an example only and not limiting. The method 1700 may be altered, e.g., by having stages added, removed, rearranged, combined, performed concurrently, and/or having single stages split into multiple stages. For example, one or more of stages 1705, 1730, 1740, 1750 may be omitted.

At stage 1705, the method 1700 may include transferring, between a communication device and another entity, a wireless data signal within a communication frequency range. For example, the processor 810 may transmit and/or receive wireless communications (e.g., wireless cellular communications) to and/or from a UE or a base station via the transceiver 820. The processor 810, possibly in combination with the memory 830, in combination with the transceiver 820 (e.g., a wireless transmitter and an antenna, or a wireless receiver and the antenna, or a wireless transmitter, wireless receiver, and antenna) may comprise means for transferring a wireless data signal between the communication device and another entity.

At stage 1710, the method 1700 includes determining, at the communication device, a capability of the communication device to measure a wireless radar signal having a frequency in the communication frequency range. For example, the radar capability determination unit 850 determines the capability of the device 1601 (and/or the device 1602) to receive and measure the wireless radar signal with a (possibly cellular) communication frequency, e.g., with desired accuracy and/or a desired capacity to represent the received wireless radar signal (e.g., without clipping). The determination unit 850 may determine the capability based on one or more factors as discussed above, possibly as indicated by a request received from the server 1500. The processor 810, possibly in combination with the memory 830, may comprise means for determining the capability of the communication device to measure the wireless radar signal.

At stage 1720, the method 1700 includes transmitting, from the communication device to a network entity, a capability indication of the capability of the communication device to measure the wireless radar signal, the capability indication being indicative of a transmit power level of the wireless radar signal from a source of the wireless radar signal or a received power level of the wireless radar signal at the communication device. For example, the reporting unit 860 of the device 1601 (and/or the device 1602) may transmit the capability (ies) message 1632 (and/or the message 1634) to the server 1500 indicating the ability of the device 1601 to receive and measure the radar signal with a desired accuracy (e.g., with at least a threshold accuracy, e.g., to determine position information). The indication of the transmit power level may be an explicit absolute or relative power. As another example, the indication of the transmit power level may be an indication of one or more radar signals received and successfully measured (e.g., without clipping). The indication of the one or more signals may include a signal ID that the server 1500 may use to determine the transmit power based on known signal IDs and corresponding transmit powers. The processor 810, possibly in combination with the memory 830, in combination with the transceiver 820 (e.g., a wireless transmitter and an antenna) may comprise means for transmitting the capability indication.

At stage 1730, the method 1700 may include receiving, at the communication device, the wireless radar signal within a communication frequency range. For example, the communication device 1601 receives the reflection 1658 of the radar signal 1652. As another example, the device 1602 receives the reflection 1656. The processor 810, possibly in combination with the memory 830, in combination with the transceiver 820 (e.g., a wireless receiver and an antenna) may comprise means for receiving the wireless radar signal.

At stage 1740, the method 1700 may include determining a positioning parameter of the wireless radar signal. For example, the processor 810 (of the device 1601 and/or the device 1602) may measure the wireless radar signal to determine position information, e.g., a measurement such as a received power, a ToA, an RSRP, an AoA, etc. The processor 810, possibly in combination with the memory 830, may comprise means for determining the positioning parameter.

At stage 1750, the method 1700 may include transmitting a positioning parameter indication of the positioning parameter via the transceiver to a network entity. For example, the processor 810 may transmit the positioning parameter via the transceiver 820 to the server 1500, e.g., in the position information message 1664, 1668. The processor 810, possibly in combination with the memory 830, in combination with the transceiver 820 (e.g., a wireless transmitter and an antenna) may comprise means for transmitting the second indication.

Implementations of the method 1700 may include one or more of the following features. In an example implementation, the capability indication is indicative of one or more received power levels comprising a sensitivity power level, or a saturation power level, or both the sensitivity power level and the saturation power level. In another example implementation, the capability indication is indicative of the received power level of the wireless radar signal, the capability indication being a relative power level. For example, the capability indication may be a power level relative to a specified static power level (e.g., a specified numerical value) or a variable power level (e.g., a thermal noise floor). In another example implementation, the capability indication is indicative of the transmit power level, the capability indication indicating a successful processing of the wireless radar signal. The capability indication may be implicit, e.g., indicating a successfully received signal that corresponds to a known transmit power. In another example implementation, the received power level is a first received power level of the wireless radar signal received as a reflected signal, and the capability indication is indicative of the first received power level relative to a second received power level of the wireless radar signal received as a leakage signal. For example, the capability indication may be a ratio of the reflected signal 540 and the leakage signal 550 or another indication of the relative powers. Such a capability indication may be useful in monostatic systems. In another example implementation, the received power level is a first received power level of the wireless radar signal, and the capability indication is indicative of the first received power level relative to a second received power level of the wireless data signal. For example, an indication of relative power of a radar signal to a data signal may be useful in determining whether the communication device is able to measure the radar signal, e.g., with the radar signal being within a threshold relationship to the data signal (e.g., within a threshold number of decibels of the data signal). In another example implementation, the method 1700 comprises determining the capability indication in response to receiving a request, from the network entity, for processing of the wireless radar signal. In another example implementation, transmitting the capability indication comprises: transmitting the capability indication in response to a request from the network entity to process the wireless radar signal; or transmitting the capability indication periodically; or transmitting the capability indication semi-persistently; or any combination thereof.

Also or alternatively, implementations of the method 1700 may include one or more of the following features. In an example implementation, determining the capability indication is based on: (1) a first frequency band, within the communication frequency range, for receiving the wireless radar signal; or (2) a first frequency band combination, within the communication frequency range, for receiving the wireless radar signal; or (3) a combination of the first frequency band and a second frequency band, within the communication frequency range, for transfer of a wireless data signal concurrently with receiving the wireless radar signal; or (4) a combination of the first frequency band and a second frequency band combination, within the communication frequency range, for transfer of the wireless data signal concurrently with receiving the wireless radar signal; or (5) a frequency gap between a first resource element of the wireless radar signal and a second resource element of the wireless data signal; or (6) one or more components selected to receive the wireless radar signal; or (7) one or more components available for selection to receive the wireless radar signal; or (8) expected attenuation of the wireless radar signal; or (9) a transmit power used to transmit the wireless data signal from the communication device; or (10) a pairing of one or more radio frequency transmit components of the communication device and one or more radio frequency receive components of the communication device; or (11) a resource set of the wireless radar signal, or a resource of the wireless radar signal, or a frequency layer of the wireless radar signal; or any combination of (1)-(11). In another example implementation, transmitting the capability indication comprises transmitting the capability indication associated with one of (1)-(11) or a combination of two or more of (1)-(11). In another example implementation, the capability indication comprises a device type of the communication device.

Figure 18:
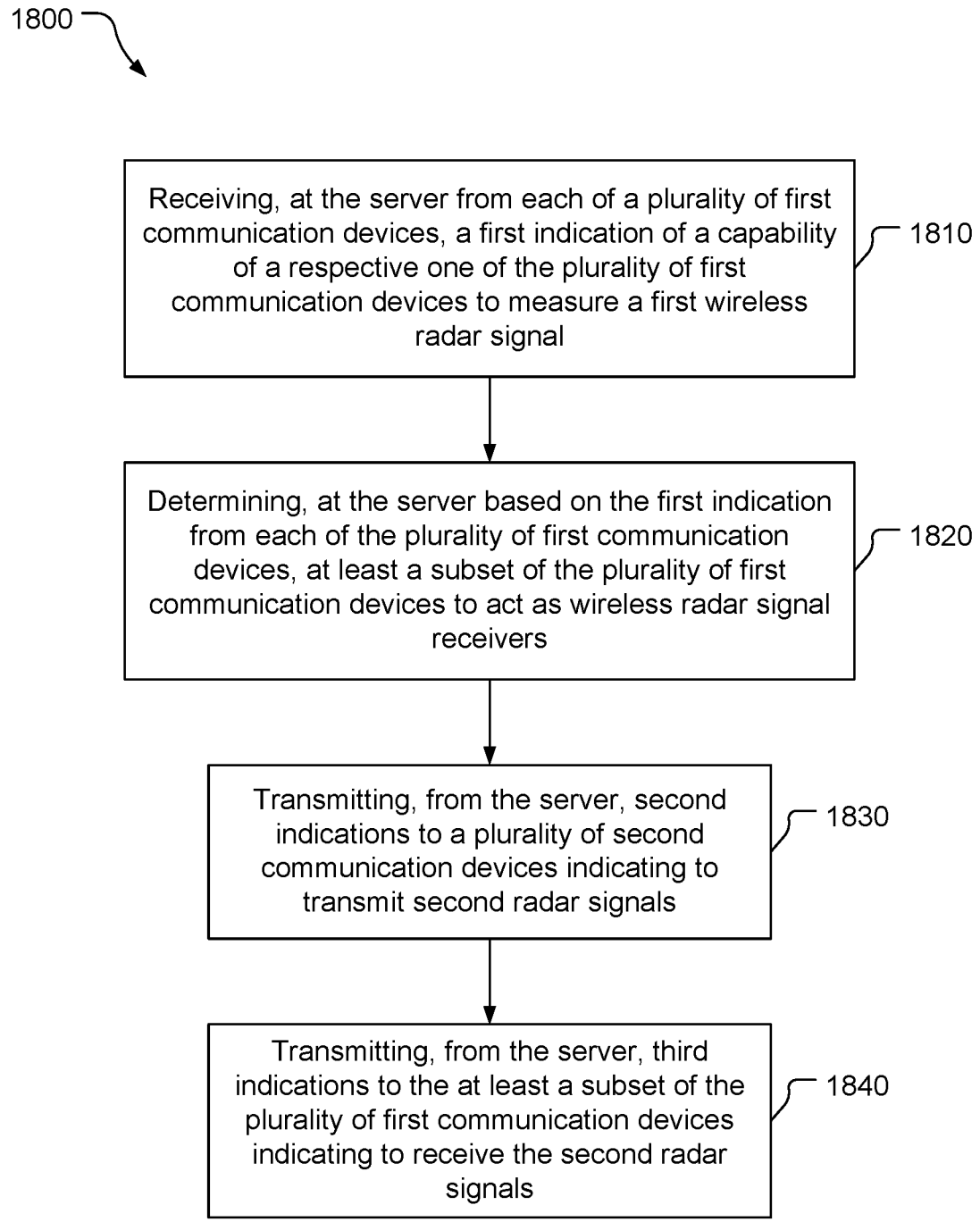
FIG. 18 is a block flow diagram of coordinating radar signaling.

Referring to FIG. 18, with further reference to FIGS. 1-17, a method 1800 of coordinating radar signaling by a server includes the stages shown. The method 1700 is, however, an example only and not limiting. The method 1700 may be altered, e.g., by having stages added, removed, rearranged, combined, performed concurrently, and/or having single stages split into multiple stages. For example, one or more of stages 1705, 1730, 1740, 1750 may be omitted.

At stage 1810, the method 1800 includes receiving, at the server from each of a plurality of first communication devices, a first indication of a capability of a respective one of the plurality of first communication devices to measure a first wireless radar signal. For example, the radar capability collection unit 1550 of the server 1500 receives the capability(ies) messages 1632, 1634 from the communication devices 1601, 1602. The messages 1632, 1634 may indicate the ability of the devices 1601, 1602 to measure radar signals at all or with desired accuracy. The ability may be indicated by one or more parameters such as a sensitivity and/or a saturation of the device 1601, 1602. The one or more parameters may be provided corresponding to one or more factors potentially affecting the ability of the device 1601, 1602 to measure radar signals. The processor 1510, possibly in combination with the memory 1530, in combination with the transceiver 1520 (e.g., the wireless receiver 444 and the antenna 446 and/or the wired receiver 454) may comprise means for receiving the first indication.

At stage 1820, the method 1800 includes determining, at the server based on the first indication from each of the plurality of first communication devices, at least a subset of the plurality of first communication devices to act as wireless radar signal receivers. For example, the radar capability collection unit 1550 may determine one or more of the devices from which the capability indication(s) were received to use for receiving radar signals. The collection unit 1550 may determine one or more devices from which the server 1500 did not receive a capability message to use for radar signaling. For example, the collection unit 1550 may be aware of radar capabilities of devices without receiving a capability message from the devices. The processor 1510, possibly in combination with the memory 1530, may comprise means for determining the at least a subset of the plurality of first communication devices to act as wireless radar signal receivers.

At stage 1830, the method 1800 includes transmitting, from the server, second indications to a plurality of second communication devices indicating to transmit second radar signals. For example, the radar Tx/Rx coordination unit 1560 may transmit instructions (e.g., the instruction 1642) to one or more appropriate devices to instruct the device(s) to transmit radar signals. The processor 1510, possibly in combination with the memory 1530, in combination with the transceiver 1520 (e.g., the wireless transmitter 442 and the antenna 446 and/or the wired transmitter 452) may comprise means for transmitting the second indications.

At stage 1840, the method 1800 includes transmitting, from the server, third indications to the at least a subset of the plurality of first communication devices indicating to receive the second radar signals. For example, the radar Tx/Rx coordination unit 1560 may transmit instructions (e.g., the instructions 1642, 1644) to one or more appropriate devices to instruct the device(s) to receive radar signals. The processor 1510, possibly in combination with the memory 1530, in combination with the transceiver 1520 (e.g., the wireless transmitter 442 and the antenna 446 and/or the wired transmitter 452) may comprise means for transmitting the third indications.

Implementations of the method 1800 may include one or more of the following features. In an example implementation, transmitting the second indications comprises transmitting the second indications with each of at least one of the second indications indicating a transmit power to be used by a respective communication device of the plurality of second communication devices. The coordination unit 1560 may instruct a device not only to transmit a radar signal but at what transmit power to transmit the radar signal, e.g., based on capability information received and/or other information from which the processor 1510 determines a transmit power to be used by a device in order for the corresponding radar signal to be measured successfully (e.g., with desired accuracy, such as without clipping). In another example implementation, the method 1800 comprises transmitting one or more fourth indications to establish a respective training phase window for one or more of the plurality of first communication devices to use to determine the first indication. For example, one or more of the instructions 1642, 1644 may include information regarding one or more guard periods for one or more of the devices 1601, 1602 to use to measure signals or otherwise determine abilities (or inabilities) of the devices 1601, 1602 to measure radar signals. Also or alternatively, the coordination unit 1560 may transmit one or more messages to one or more serving TRPs 300 for the serving TRPs to configure one or more guard periods for one or more devices to determine radar measuring capability(ies). The processor 1510, possibly in combination with the memory 1530, in combination with the transceiver 1520 (e.g., the wireless transmitter 442 and the antenna 446 and/or the wired transmitter 452) may comprise means for transmitting the one or more fourth indications.

Also or alternatively, implementations of the method 1800 may include one or more of the following features. In an example implementation, the method 1800 comprises transmitting a fifth indication to each of at least a subset of the plurality of second communication devices indicating to transmit a plurality of test wireless radar signals each with a different transmit power. For example, the collection unit 1550 may instruct one or more communication devices 800 to transmit a set of signals with known, different transmit power levels such that the lack of receipt, receipt without saturation, and/or receipt with saturation can be used to determine which transmit power levels to use at respective communication devices 800 for transmitting radar signals. The processor 1510, possibly in combination with the memory 1530, in combination with the transceiver 1520 (e.g., the wireless transmitter 442 and the antenna 446 and/or the wired transmitter 452) may comprise means for transmitting the one or more fifth indications. In another example implementation, the method 1800 comprises receiving a sixth indication from a particular first communication device of the plurality of first communication devices indicating which of the test wireless radar signals the particular first communication device successfully measured, and transmitting the second indications comprises transmitting at least one of the second indications indicating a transmit power to be used by a particular second communication device of the plurality of second communication devices based on the sixth indication. For example, one of the communication devices 800 may indicate that a test radar signal was received and measured, e.g., without saturation of the device 800. The collection unit 1550 may use this information to instruct the device that sent that radar signal to use the corresponding transmit power level for future radar signal transmissions. The processor 1510, possibly in combination with the memory 1530, in combination with the transceiver 1520 (e.g., the wireless receiver 444 and the antenna 446 and/or the wired receiver 454) may comprise means for receiving the sixth indication and the processor 1510, possibly in combination with the memory 1530, in combination with the transceiver 1520 (e.g., the wireless transmitter 442 and the antenna 446 and/or the wired transmitter 452) may comprise means for transmitting the at least one of the second indications.

IMPLEMENTATION EXAMPLES

Implementation examples are provided in the following numbered clauses.

1. A radar server comprising:
    a transceiver;
    a memory; and
    a processor communicatively coupled to the transceiver and the memory and configured to:
    receive, via the transceiver from each of a plurality of first communication devices, a first indication of a capability of a respective one of the plurality of first communication devices to measure a first wireless radar signal;
    determine, based on the first indication from each of the plurality of first communication devices, at least a subset of the plurality of first communication devices to act as wireless radar signal receivers;
    transmit second indications to a plurality of second communication devices indicating to transmit second radar signals; and
    transmit third indications to the at least a subset of the plurality of first communication devices indicating to receive the second radar signals.

2. The radar server of clause 1, wherein the processor is configured to transmit the second indications with each of at least one of the second indications indicating a transmit power to be used by a respective communication device of the plurality of second communication devices.

3. The radar server of clause 1, wherein the processor is configured to transmit one or more fourth indications via the transceiver to establish a respective training phase window for one or more of the plurality of first communication devices to use to determine the first indication.

4. The radar server of clause 1, wherein the processor is configured to transmit a fifth indication via the transceiver to each of at least a subset of the plurality of second communication devices indicating to transmit a plurality of test wireless radar signals each with a different transmit power.

5. The radar server of clause 4, wherein the processor is configured to:
    receive a sixth indication from a particular first communication device of the plurality of first communication devices indicating which of the plurality of test wireless radar signals the particular first communication device successfully measured; and
    transmit at least one of the second indications indicating a transmit power to be used by a particular second communication device of the plurality of second communication devices based on the sixth indication.

6. A radar server comprising:
    means for receiving, from each of a plurality of first communication devices, a first indication of a capability of a respective one of the plurality of first communication devices to measure a first wireless radar signal;
    means for determining, based on the first indication from each of the plurality of first communication devices, at least a subset of the plurality of first communication devices to act as wireless radar signal receivers;
    means for transmitting second indications to a plurality of second communication devices indicating to transmit second radar signals; and
    means for transmitting third indications to the at least a subset of the plurality of first communication devices indicating to receive the second radar signals.

7. The radar server of clause 6, wherein the means for transmitting the second indications comprise means for transmitting the second indications with each of at least one of the second indications indicating a transmit power to be used by a respective communication device of the plurality of second communication devices.

8. The radar server of clause 6, further comprising means for transmitting one or more fourth indications to establish a respective training phase window for one or more of the plurality of first communication devices to use to determine the first indication.

9. The radar server of clause 6, further comprising means for transmitting a fifth indication to each of at least a subset of the plurality of second communication devices indicating to transmit a plurality of test wireless radar signals each with a different transmit power.

10. The radar server of clause 9, further comprising means for receiving a sixth indication from a particular first communication device of the plurality of first communication devices indicating which of the plurality of test wireless radar signals the particular first communication device successfully measured, wherein the means for transmitting the second indications comprise means for transmitting at least one of the second indications indicating a transmit power to be used by a particular second communication device of the plurality of second communication devices based on the sixth indication.

11. A method of coordinating radar signaling by a server, the method comprising:
    receiving, at the server from each of a plurality of first communication devices, a first indication of a capability of a respective one of the plurality of first communication devices to measure a first wireless radar signal;
    determining, at the server based on the first indication from each of the plurality of first communication devices, at least a subset of the plurality of first communication devices to act as wireless radar signal receivers;
    transmitting, from the server, second indications to a plurality of second communication devices indicating to transmit second radar signals; and transmitting, from the server, third indications to the at least a subset of the plurality of first communication devices indicating to receive the second radar signals.

12. The method of clause 11, wherein transmitting the second indications comprises transmitting the second indications with each of at least one of the second indications indicating a transmit power to be used by a respective communication device of the plurality of second communication devices.

13. The method of clause 11, further comprising transmitting one or more fourth indications to establish a respective training phase window for one or more of the plurality of first communication devices to use to determine the first indication.

14. The method of clause 11, further comprising transmitting a fifth indication to each of at least a subset of the plurality of second communication devices indicating to transmit a plurality of test wireless radar signals each with a different transmit power.

15. The method of clause 14, further comprising receiving a sixth indication from a particular first communication device of the plurality of first communication devices indicating which of the plurality of test wireless radar signals the particular first communication device successfully measured, wherein transmitting the second indications comprises transmitting at least one of the second indications indicating a transmit power to be used by a particular second communication device of the plurality of second communication devices based on the sixth indication.

16. A non-transitory, processor-readable storage medium comprising processor-readable instructions configured to cause a processor of a server to:
receive, from each of a plurality of first communication devices, a first indication of a capability of a respective one of the plurality of first communication devices to measure a first wireless radar signal;
determine, based on the first indication from each of the plurality of first communication devices, at least a subset of the plurality of first communication devices to act as wireless radar signal receivers;
transmit second indications to a plurality of second communication devices indicating to transmit second radar signals; and
transmit third indications to the at least a subset of the plurality of first communication devices indicating to receive the second radar signals.

17. The storage medium of clause 16, wherein the processor-readable instructions configured to cause the processor to transmit the second indications comprise instructions configured to cause the processor to transmit the second indications with each of at least one of the second indications indicating a transmit power to be used by a respective communication device of the plurality of second communication devices.

18. The storage medium of clause 16, further comprising processor-readable instructions configured to cause the processor to transmit one or more fourth indications to establish a respective training phase window for one or more of the plurality of first communication devices to use to determine the first indication.

19. The storage medium of clause 16, further comprising processor-readable instructions configured to cause the processor to transmit a fifth indication to each of at least a subset of the plurality of second communication devices indicating to transmit a plurality of test wireless radar signals each with a different transmit power.

20. The storage medium of clause 19, further comprising processor-readable instructions configured to cause the processor to receive a sixth indication from a particular first communication device of the plurality of first communication devices indicating which of the plurality of test wireless radar signals the particular first communication device successfully measured, wherein the processor-readable instructions configured to cause the processor to transmit the second indications comprise instructions configured to cause the processor to transmit at least one of the second indications indicating a transmit power to be used by a particular second communication device of the plurality of second communication devices based on the sixth indication.

OTHER CONSIDERATIONS

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, the term RS (reference signal) may refer to one or more reference signals and may apply, as appropriate, to any form of the term RS, e.g., PRS, SRS, CSI-RS, etc.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A communication device comprising:
a transceiver;
a memory; and
a processor communicatively coupled to the transceiver and the memory and configured to:
transfer, via the transceiver, a wireless data signal within a communication frequency range;
determine, based on reception of a reflected test radar signal, a capability of the communication device to measure a wireless radar signal received via the transceiver concurrently with transfer of the wireless data signal, the wireless radar signal and the reflected test radar signal each having a frequency within the communication frequency range;
transmit, via the transceiver to a network entity, a first indication of the capability of the communication device to measure the wireless radar signal as a radar signal concurrently with transfer of the wireless data signal, the first indication being indicative of a transmit power level of the wireless radar signal from a source of the wireless radar signal or a received power level of the wireless radar signal at the communication device;
receive, via the transceiver, the wireless radar signal;
determine a positioning measurement of the wireless radar signal; and
transmit a second indication of the positioning measurement via the transceiver to the network entity.

2. The communication device of claim 1, wherein the first indication is indicative of one or more received power levels comprising a sensitivity power level, or a saturation power level, or both the sensitivity power level and the saturation power level.

3. The communication device of claim 1, wherein the first indication is indicative of the received power level relative to a reference power level.

4. The communication device of claim 1, wherein the first indication is indicative of the transmit power level, the first indication indicating a successful processing of the wireless radar signal.

5. The communication device of claim 1, wherein the first indication is indicative of the received power level, wherein the received power level is a first received power level of the wireless radar signal received as a reflected signal, and wherein the first indication is indicative of the first received power level relative to a second received power level of the wireless radar signal received as a leakage signal.

6. The communication device of claim 1, wherein the first indication is indicative of the received power level, wherein the received power level is a first received power level of the wireless radar signal, and wherein the first indication is indicative of the first received power level relative to a second received power level of the wireless data signal.

7. The communication device of claim 1, wherein the processor is configured to determine the first indication in response to receiving a request, from the network entity via the transceiver, for processing of the wireless radar signal.

8. The communication device of claim 1, wherein the processor is:
configured to transmit the first indication in response to a request from the network entity to process the wireless radar signal; or
configured to transmit the first indication periodically; or
configured to transmit the first indication semi-persistently; or
any combination thereof.

9. The communication device of claim 1, wherein the processor is configured to determine the first indication based on:
(1) a first frequency band, within the communication frequency range, for receiving the wireless radar signal; or
(2) a first frequency band combination, within the communication frequency range, for receiving the wireless radar signal; or
(3) a combination of the first frequency band and a second frequency band, within the communication frequency range, for transfer of the wireless data signal concurrently with receiving the wireless radar signal; or
(4) a combination of the first frequency band and a second frequency band combination, within the communication frequency range, for transfer of the wireless data signal concurrently with receiving the wireless radar signal; or
(5) a frequency gap between a first resource element of the wireless radar signal and a second resource element of the wireless data signal; or
(6) one or more components selected by the processor to receive the wireless radar signal; or
(7) one or more components available for selection to receive the wireless radar signal; or
(8) expected attenuation of the wireless radar signal; or
(9) a transmit power of the transceiver used to transmit the wireless data signal; or
(10) a pairing of one or more radio frequency transmit components of the communication device and one or more radio frequency receive components of the communication device; or
(11) a resource set of the wireless radar signal, or a resource of the wireless radar signal, or a frequency layer of the wireless radar signal; or
any combination of (1)-(11).

10. The communication device of claim 9, wherein the processor is configured to transmit the first indication associated with one of (1)-(11) or a combination of two or more of (1)-(11).

11. The communication device of claim 1, wherein the first indication comprises a device type of the communication device.

12. A communication device comprising:
means for transferring a wireless data signal within a communication frequency range;
means for determining, based on reception of a reflected test radar signal, a capability of the communication device to measure a wireless radar signal concurrently with transfer of the wireless data signal, the wireless radar signal and the reflected test radar signal each having a frequency within the communication frequency range;
means for transmitting, to a network entity, a first indication of the capability of the communication device to measure the wireless radar signal as a radar signal concurrently with transfer of the wireless data signal, the first indication being indicative of a transmit power level of the wireless radar signal from a source of the wireless radar signal or a received power level of the wireless radar signal at the communication device;
means for receiving the wireless radar signal;
means for determining a positioning measurement of the wireless radar signal; and
means for transmitting, to the network entity, a second indication of the positioning measurement.

13. The communication device of claim 12, wherein the first indication is indicative of one or more received power levels comprising a sensitivity power level, or a saturation power level, or both the sensitivity power level and the saturation power level.

14. The communication device of claim 12, wherein the first indication is indicative of the received power level relative to a reference power level.

15. The communication device of claim 12, wherein the first indication is indicative of the transmit power level, the first indication indicating a successful processing of the wireless radar signal.

16. The communication device of claim 12, wherein the first indication is indicative of the received power level, wherein the received power level is a first received power level of the wireless radar signal received as a reflected signal, and wherein the first indication is indicative of the first received power level relative to a second received power level of the wireless radar signal received as a leakage signal.

17. The communication device of claim 12, wherein the first indication is indicative of the received power level, wherein the received power level is a first received power level of the wireless radar signal, and wherein the first indication is indicative of the first received power level relative to a second received power level of the wireless data signal.

18. The communication device of claim 12, further comprising means for determining the first indication in response to receiving a request, from the network entity, for processing of the wireless radar signal.

19. The communication device of claim 12, wherein the means for transmitting the first indication comprise:
means for transmitting the first indication in response to a request from the network entity to process the wireless radar signal; or
means for transmitting the first indication periodically; or
means for transmitting the first indication semi-persistently; or
any combination thereof.

20. The communication device of claim 12, further comprising means for determining the first indication based on:
(1) a first frequency band, within the communication frequency range, for receiving the wireless radar signal; or
(2) a first frequency band combination, within the communication frequency range, for receiving the wireless radar signal; or
(3) a combination of the first frequency band and a second frequency band, within the communication frequency range, for transfer of the wireless data signal concurrently with receiving the wireless radar signal; or
(4) a combination of the first frequency band and a second frequency band combination, within the communication frequency range, for transfer of the wireless data signal concurrently with receiving the wireless radar signal; or
(5) a frequency gap between a first resource element of the wireless radar signal and a second resource element of the wireless data signal; or
(6) one or more components selected to receive the wireless radar signal; or
(7) one or more components available for selection to receive the wireless radar signal; or
(8) expected attenuation of the wireless radar signal; or
(9) a transmit power of the means for transferring the wireless data signal; or
(10) a pairing of one or more radio frequency transmit components of the communication device and one or more radio frequency receive components of the communication device; or
(11) a resource set of the wireless radar signal, or a resource of the wireless radar signal, or a frequency layer of the wireless radar signal; or
any combination of (1)-(11).

21. The communication device of claim 20, wherein the means for transmitting the first indication comprise means for transmitting the first indication associated with one of (1)-(11) or a combination of two or more of (1)-(11).

22. The communication device of claim 12, wherein the first indication comprises a device type of the communication device.

23. A method of reporting radar signal measuring capability, the method comprising:
determining, at a communication device based on reception of a reflected test radar signal, a capability of the communication device to measure a wireless radar signal concurrently with transfer of a wireless data signal that has a frequency within a communication frequency range, the wireless radar signal and the reflected test radar signal each having a frequency in the communication frequency range; and
transmitting, from the communication device to a network entity, a capability indication of the capability of the communication device to measure the wireless radar signal as a radar signal concurrently with transfer of the wireless data signal, the capability indication being indicative of a transmit power level of the wireless radar signal from a source of the wireless radar signal or a received power level of the wireless radar signal at the communication device.

24. The method of claim 23, wherein the capability indication is indicative of one or more received power levels comprising a sensitivity power level, or a saturation power level, or both the sensitivity power level and the saturation power level.

25. The method of claim 23, wherein the capability indication is indicative of the received power level of the wireless radar signal relative to a reference power level.

26. The method of claim 23, wherein the capability indication is indicative of the transmit power level, the capability indication indicating a successful processing of the wireless radar signal.

27. The method of claim 23, wherein the first indication is indicative of the received power level, wherein the received power level is a first received power level of the wireless radar signal received as a reflected signal, and wherein the capability indication is indicative of the first received power level relative to a second received power level of the wireless radar signal received as a leakage signal.

28. The method of claim 23, wherein the first indication is indicative of the received power level, wherein the received power level is a first received power level of the wireless radar signal, and wherein the capability indication is indicative of the first received power level relative to a second received power level of the wireless data signal.

29. The method of claim 23, further comprising determining the capability indication in response to receiving a request, from the network entity, for processing of the wireless radar signal.

30. The method of claim 23, wherein transmitting the capability indication comprises:
transmitting the capability indication in response to a request from the network entity to process the wireless radar signal; or
transmitting the capability indication periodically; or
transmitting the capability indication semi-persistently; or
any combination thereof.

31. The method of claim 23, further comprising determining the capability indication based on:
(1) a first frequency band, within the communication frequency range, for receiving the wireless radar signal; or
(2) a first frequency band combination, within the communication frequency range, for receiving the wireless radar signal; or
(3) a combination of the first frequency band and a second frequency band, within the communication frequency range, for transfer of a wireless data signal concurrently with receiving the wireless radar signal; or
(4) a combination of the first frequency band and a second frequency band combination, within the communication frequency range, for transfer of the wireless data signal concurrently with receiving the wireless radar signal; or
(5) a frequency gap between a first resource element of the wireless radar signal and a second resource element of the wireless data signal; or
(6) one or more components selected to receive the wireless radar signal; or
(7) one or more components available for selection to receive the wireless radar signal; or (8) expected attenuation of the wireless radar signal; or
(9) a transmit power used to transmit the wireless data signal from the communication device; or
(10) a pairing of one or more radio frequency transmit components of the communication device and one or more radio frequency receive components of the communication device; or
(11) a resource set of the wireless radar signal, or a resource of the wireless radar signal, or a frequency layer of the wireless radar signal; or
any combination of (1)-(11).

32. The method of claim 31, wherein transmitting the capability indication comprises transmitting the capability indication associated with one of (1)-(11) or a combination of two or more of (1)-(11).

33. The method of claim 23, wherein the capability indication comprises a device type of the communication device.

34. A non-transitory, processor-readable storage medium comprising processor-readable instructions configured to cause a processor of a communication device to:
determine, based on reception of a reflected test radar signal, a capability of the communication device to measure a wireless radar signal concurrently with transfer of a wireless data signal that has a frequency within a communication frequency range, the wireless radar signal and the reflected test radar signal each having a frequency in communication frequency range; and
transmit, to a network entity, a capability indication of the capability of the communication device to measure the wireless radar signal as a radar signal concurrently with transfer of the wireless data signal, the capability indication being indicative of a transmit power level of the wireless radar signal from a source of the wireless radar signal or a received power level of the wireless radar signal at the communication device.

35. The storage medium of claim 34, wherein the capability indication is indicative of one or more received power levels comprising a sensitivity power level, or a saturation power level, or both the sensitivity power level and the saturation power level.

36. The storage medium of claim 34, wherein the capability indication is indicative of the received power level of the wireless radar signal relative to a reference power level.

37. The storage medium of claim 34, wherein the capability indication is indicative of the transmit power level, the capability indication indicating a successful processing of the wireless radar signal.

38. The storage medium of claim 34, wherein the first indication is indicative of the received power level, wherein the received power level is a first received power level of the wireless radar signal received as a reflected signal, and wherein the capability indication is indicative of the first received power level relative to a second received power level of the wireless radar signal received as a leakage signal.

39. The storage medium of claim 34, wherein the first indication is indicative of the received power level, wherein the received power level is a first received power level of the wireless radar signal, and wherein the capability indication is indicative of the first received power level relative to a second received power level of the wireless data signal.

40. The storage medium of claim 34, further comprising processor-readable instructions configured to cause the processor to determine the capability indication in response to receiving a request, from the network entity, for processing of the wireless radar signal.

41. The storage medium of claim 34, wherein the processor-readable instructions configured to cause the processor to transmit the capability indication comprise processor-readable instructions configured to cause the processor to:
transmit the capability indication in response to a request from the network entity to process the wireless radar signal; or
transmit the capability indication periodically; or
transmit the capability indication semi-persistently; or
any combination thereof.

42. The storage medium of claim 34, further comprising processor-readable instructions configured to cause the processor to determine the capability indication based on:
(1) a first frequency band, within the communication frequency range, for receiving the wireless radar signal; or
(2) a first frequency band combination, within the communication frequency range, for receiving the wireless radar signal; or
(3) a combination of the first frequency band and a second frequency band, within the communication frequency range, for transfer of a wireless data signal concurrently with receiving the wireless radar signal; or
(4) a combination of the first frequency band and a second frequency band combination, within the communication frequency range, for transfer of the wireless data signal concurrently with receiving the wireless radar signal; or
(5) a frequency gap between a first resource element of the wireless radar signal and a second resource element of the wireless data signal; or
(6) one or more components selected to receive the wireless radar signal; or
(7) one or more components available for selection to receive the wireless radar signal; or
(8) expected attenuation of the wireless radar signal; or
(9) a transmit power used to transmit the wireless data signal from the communication device; or
(10) a pairing of one or more radio frequency transmit components of the communication device and one or more radio frequency receive components of the communication device; or
(11) a resource set of the wireless radar signal, or a resource of the wireless radar signal, or a frequency layer of the wireless radar signal; or
any combination of (1)-(11).

43. The storage medium of claim 42, wherein the processor-readable instructions configured to cause the processor to transmit the capability indication comprise processor-readable instructions configured to cause the processor to transmit the capability indication associated with one of (1)-(11) or a combination of two or more of (1)-(11).

44. The storage medium of claim 34, wherein the capability indication comprises a device type of the communication device.

* * * * *